(12) United States Patent
Brown et al.

(10) Patent No.: US 8,365,293 B2
(45) Date of Patent: Jan. 29, 2013

(54) SECURING COMPUTER NETWORK INTERACTIONS BETWEEN ENTITIES WITH AUTHORIZATION ASSURANCES

(75) Inventors: Mark D. Brown, St. Paul, MN (US); David J. Wilke, Mendota Heights, MN (US)

(73) Assignee: RedPhone Security, Inc., St. Paul, MN (US)

( * ) Notice: Subject to any disclaimer, the term of this patent is extended or adjusted under 35 U.S.C. 154(b) by 1461 days.

(21) Appl. No.: 11/234,404

(22) Filed: Sep. 23, 2005

(65) Prior Publication Data

US 2006/0174323 A1 Aug. 3, 2006

Related U.S. Application Data

(60) Provisional application No. 60/646,749, filed on Jan. 25, 2005.

(51) Int. Cl.
*H04L 29/06* (2006.01)
(52) U.S. Cl. .......... 726/26; 726/27; 705/51; 705/59
(58) Field of Classification Search .......... None
See application file for complete search history.

(56) References Cited

U.S. PATENT DOCUMENTS

| | | | |
|---|---|---|---|
| 5,509,071 A | 4/1996 | Petrie, Jr. et al. | |
| 6,023,766 A * | 2/2000 | Yamamura | 726/29 |
| 6,163,844 A | 12/2000 | Duncan et al. | |
| 6,199,204 B1 * | 3/2001 | Donohue | 717/178 |
| 6,219,652 B1 * | 4/2001 | Carter et al. | 705/59 |
| 6,226,624 B1 | 5/2001 | Watson et al. | |
| 6,959,289 B1 * | 10/2005 | James et al. | 705/51 |
| 7,099,849 B1 * | 8/2006 | Reeder et al. | 705/59 |
| 2002/0019767 A1 * | 2/2002 | Babbitt et al. | 705/12 |
| 2002/0120582 A1 * | 8/2002 | Elston et al. | 705/64 |
| 2003/0145205 A1 * | 7/2003 | Sarcanin | 713/172 |
| 2003/0167392 A1 * | 9/2003 | Fransdonk | 713/156 |
| 2003/0212905 A1 * | 11/2003 | Tran et al. | 713/201 |
| 2004/0039916 A1 * | 2/2004 | Aldis et al. | 713/177 |
| 2004/0210756 A1 | 10/2004 | Mowers et al. | |
| 2006/0294366 A1 | 12/2006 | Nadalin et al. | |

OTHER PUBLICATIONS

Reply to Written Opinion filed Dec. 20, 2007 for counterpart application No. PCT/US2006/001342, (37 pages).
"Welcome to the OpenSSL Project," 2 pages, downloadable from http://www.openssl.org, printed Dec. 14, 2005.
M. Wahl et al., "Lightweight Directory Access Protocol (v3)," Dec. 1997, 47 pages, downloadable from http://www.ietf.org/rfc/rfc2251.txt, printed Dec. 14, 2005.
E. Rescorla, "HTTP Over TLS," May 2000, 7 pages, downloadable from http://www.ietf.org/rfc/rfc2818.txt, printed Dec. 14, 2005.
"Specification: Web Services Security (WS-Security)," 28 pages, downloadable from http://www-128.ibm.com/developerworks/webservices/library/ws-secure, printed Dec. 14, 2005.

(Continued)

*Primary Examiner* — Benjamin Lanier
(74) *Attorney, Agent, or Firm* — Shumaker & Sieffert, P.A.

(57) ABSTRACT

The invention is directed to techniques to secure interactions between entities communicating on a computer network. In general, techniques are described in which a first entity provides assurances to a second entity that an agent interacting with the second entity is interacting with the second entity on behalf of the first entity. Specifically, the techniques provide the second entity with information tending to indicate that the first entity authorized the agent to perform the interaction with the second entity pursuant to some prior agreement between the two entities. The techniques employ authentication systems and encryption to ensure the security of the interaction.

53 Claims, 7 Drawing Sheets

OTHER PUBLICATIONS

"Oasis Web Services Security (WSS) TC," 4 pages, downloadable from http://www.oasis-open.org/committees/tc_home.php?wg_abbrev=wss, printed Dec. 14, 2005.

"Oasis Security and Privacy Considerations for the Oasis Security Assertion Markup Language (SAML) V2.0," Mar. 15, 2005, 33 pages, downloadable from http://docs.oasis-open.org/security/saml/v2.0/saml-sec-consider-2.0-os.pdf.

"Oasis Assertions and Protocols for the Oasis Security Assertion Markup Language (SAML) V2.0," Mar. 15, 2005, 86 pages, downloadable from http://docs.oasis-open.org/security/saml/v2.0/saml-core-2.0-os.pdf.

"Oasis Security Services (SAML) TC," 8 pages, downloadable from http://www.oasis-open.org/committees/tc_home.php?wg_abbrev=security, printed Dec. 14, 2005.

S. Farrell et al., "An Internet Attribute Certificate Profile for Authorization," Apr. 2002, 38 pages, downloadable from http://www.ietf.org/rfc/rfc3281.txt, printed Dec. 14, 2005.

R. Housley et al., "Internet X.509 Public Key Infrastructure Certificate and Certificate Revocation List (CRL) Profile," Apr. 2002, 121 pages, downloadable from http://www.ietf.org/rfc/rfc3280.txt, printed Dec. 14, 2005.

B. Tung et al., "Public Key Cryptography for Initial Authentication in Kerberos," 14 pages, downloadable from http://www.cybersafe.ltd.uk/docs_standards/draft-ietf-cat-kerberos-pk-init-17.txt, printed Dec. 7, 2005.

J. Kohl et al, "The Kerberos Network Authentication Service (V5)," Sep. 1993, 105 pages, downloadable from http://www.ietf.org/rfc/rfc1510.txt, printed Dec. 7, 2005.

J. Brezak, "Utilizing the Windows 2000 Authorization Data in Kerberos Tickets for Access Control to Resouces," Feb. 2002, 7 pages, downloadable from http://msdn.microsoft.com/library/en-us/dnkerb/html/MSDN_PAC.asp?frame=true, printed Dec. 14, 2005.

T. Dierks et al., "The TLS Protocol Version 1.0," Jan. 1999, 75 pages, downloadable from http://www.ietf.org/rfc/rfc2246.txt, printed Dec. 7, 2005.

S. Blake-Wilson et al., "Transport Layer Security (TLS) Extensions," Jun. 2003, 28 pages, downloadable from http://www.ietf.org/rfc/rfc3546.txt, printed Jan. 19, 2006.

A. Medvinsky et al., "Addition of Kerberos Cipher Suites to Transport Layer Security (TLS)," Oct. 1999, 7 pages, downloadable from http://www.ietf.org/rfc/rfc2712.txt, printed Dec. 21, 2005.

"U.S. Government Protection Profile for Separation Kernals in Environments Requiring High Robustness," Version 0.621, 167 pages, Jul. 1, 2004.

T.E. Levin et al., "A Least Privilege Model for Static Separation Kernels," Technical Report NPS-CS-05-003, 21 pages, Oct. 2004.

J. Rushby et al., "A Distributed Secure System," 17 pages.

J.D. Sears, "Simultaneous Connection Management and Protection in a Distributed Multilevel Security Environment," 146 pages, Sep. 2004.

Examiner's Report for corresponding Australian patent application No. 2006208324 mailed Nov. 7, 2008 (2 pages).

International Preliminary Examination Report from corresponding PCT Application Serial No. PCT/US2006/001342 mailed May 2, 2008 (6 pages).

The Notification of Transmittal of the International Search Report and Written Opinion, from corresponding PCT Application Serial No. PCT/US2006/01342, mailed Sep. 21, 2007, 11 pages.

Office Action, dated Apr. 27, 2010, for counterpart Canadian application No. 2,595,769 from the Canadian Patent Office, (5 pages).

First Examination Report, issued by the Government of India Patent Office for counterpart Indian application No. 3264/CHEN/2007, 2 pages.

Official Action dated May 27, 2011, issued by the Canadian Intellectual Property Office for counterpart Canadian applicaion No. 2,595,769, 3 pages.

Response to Indian Examination Report as filed with the Controller of Patents, the Patent Office of India dated Feb. 10, 2012 for corresponding Indian Patent Application No. 3264/CHEN/2007, 31 pages.

Response to Canadian Official Action as filed with the Canadian Intellectual Property Office dated Nov. 24, 2011 for corresponding Canadian Patent Application No. 2,595,769, 51 pages.

* cited by examiner

SECURING COMPUTER NETWORK INTERACTIONS BETWEEN ENTITIES WITH AUTHORIZATION ASSURANCES

CROSS REFERENCE TO RELATED APPLICATIONS

This application claims the benefit of U.S. Provisional Application No. 60/646,749, filed Jan. 25, 2005, the entire content of which is incorporated herein by reference.

TECHNICAL FIELD

The invention relates to computer networks, and, in particular, to the secure communication of data using a network that is not secure.

BACKGROUND

In today's information economy, entities frequently interact with other entities through computer networks. It is important to entities with more than one agent that a given agent interacts with other entities only in ways authorized by the entity. For example, a first entity may only authorize select personnel to interact with a second entity to purchase goods through the Internet. Granting limited authorization to agents helps prevent the first entity from acquiring unwanted legal obligations. At the same time, the second entity wants assurances that the first entity has authorized the agent to interact with the second entity. For example, the second entity wants to be certain that the first entity will not repudiate a legal agreement resulting from the interaction because the first entity did not authorize the agent to make the agreement.

Because of this situation, it may be crucial that entities interacting across a computer network assure one another that agents claiming to operate on behalf of the entity in fact operate on behalf of the entity. However, there are security problems inherent in exchanging such assurances. It can be difficult for one party to trust the assurances made by another party, especially when the assurances could have been made casually, falsely, or under false pretense. For instance, a third party could falsely pose as an authorized agent of a first entity and surreptitiously interact with a second entity, generally disrupting the operations of both entities. Or an agent of a first entity may falsely claim to have privileges that the first entity has not authorized. Or the first entity may casually assign computer-readable privileges to an agent and upon their later misuse, seek to avoid responsibility for their misuse. Or an unauthorized individual, such as a person with criminal intent, may create a situation of false pretense where assurances are made on his or her behalf by the first entity, and any interaction that arises may be dishonored or incur cost to one or both parties.

In another instance, a first entity may disclose a list of authorized agents to a second entity that the second entity may rely upon when authorizing requests for a network resource or resources. However, the first entity may fail to update the list of authorized agents in a timely manner, or the second entity may not possess an efficient means to update its copy of the list of authorized agents securely. Any errors in the copy of the list of authorized agents held by the second entity could lead to unauthorized actions.

In any of these or similar instances, a second entity may doubt assurances received via a public network claiming that a first entity has authorized an agent to perform certain business activities on behalf of the first entity. Compared to traditional face-to-face settings where the agent of the first entity is clothed with apparent authority to conduct business, conducting business over a network may prevent or render untrustworthy the presentation of traditional signals of apparent authority. This problem is not explained precisely as an inability to trust; parties to a traditional agreement such as a business contract commonly demonstrate a willingness to trust each other in limited ways. The problem may be better identified as difficulty in communicating trustworthy assurances regarding an agent's limited authority to act on behalf of a first entity upon the resources provided by a second entity. A system and method that invokes a memorialization of parties' willingness to trust in a limited way, and affirms the true affiliation of the agent, and also provides a secure and accurate means to "clothe" an agent undertaking business activities while communicating over a public network may be used to address the problems described above.

Several current technologies address one or more aspects of the security problem. For instance, an entity may use passwords to verify the identity of a specific agent. In addition, entities may attempt to use cryptography to ensure that unauthorized agents cannot view, alter, or create certain information. Granting possession of cryptographic certificates to agents may help prevent unauthorized agents from pretending to be authorized agents. In addition, attribute certificates or extensible markup language-based security assertions may provide a secure mechanism of supplying authorization information about an agent.

SUMMARY

In general, the invention is directed to techniques of facilitating interaction between entities through a computer network. An entity may be a legally recognized person such as a corporation, partnership, organization, government, individual, and the like. As a legally recognized person, an entity may act as a principal with respect to one or more authorized agents. Furthermore, as a legal person, an entity may authorize an agent to create a contract that legally binds the entity. The techniques of this invention assure a second entity that a first entity has authorized an agent interacting with the second entity to interact with the second entity on behalf of the first entity.

In one embodiment, the invention is directed to a method. The method comprises receiving a request sent to a second entity from an agent via a computer network. In addition, the method comprises receiving assurances via the network that a first entity has authorized the agent to send the request to the second entity on behalf of the first entity. The method further comprises complying with the request subject to acceptance of the assurances.

In another embodiment, the invention is directed to a computer-readable medium comprising computer-readable instructions. The instructions cause a processor to receive one or more agent instructions sent to a second entity from an agent via a computer network, and receive assurances via the network that a first entity has authorized the agent to send the one or more agent instructions to the second entity on behalf of the first entity. In addition, the computer readable instructions cause the processor to comply with the one or more agent instructions subject to acceptance of the assurances.

In another embodiment, the invention is directed to a method comprising sending a request to a second entity from an agent via a network. In addition, the method comprises sending assurances to the second entity via the network that a first entity has authorized the agent to send the request to the second entity on behalf of the first entity. The method further comprises receiving a response complying with the request subject to acceptance of the assurances by the second entity.

In another embodiment, the invention is directed to a computer readable medium comprising computer readable instructions that when executed in a processor, cause the processor to send one or more agent instructions to a second entity from an agent via a network and to send assurances to the second entity via the network that a first entity has authorized the agent to send the one or more agent instructions on behalf of the first entity. The computer readable instructions further cause the processor to receive a response complying with the one or more agent instructions subject to acceptance of the assurances by the second entity.

In another embodiment, the invention is directed to a system comprising a local directory server that sends a request to a second entity from an agent via a network. In addition, the local directory server sends assurances to the second entity via the network that the first entity has authorized the agent to send the request on behalf of the first entity. Further, the system comprises a remote directory server that receives the request and receives the assurances, wherein the remote directory server complies with the request subject to acceptance of the assurances.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
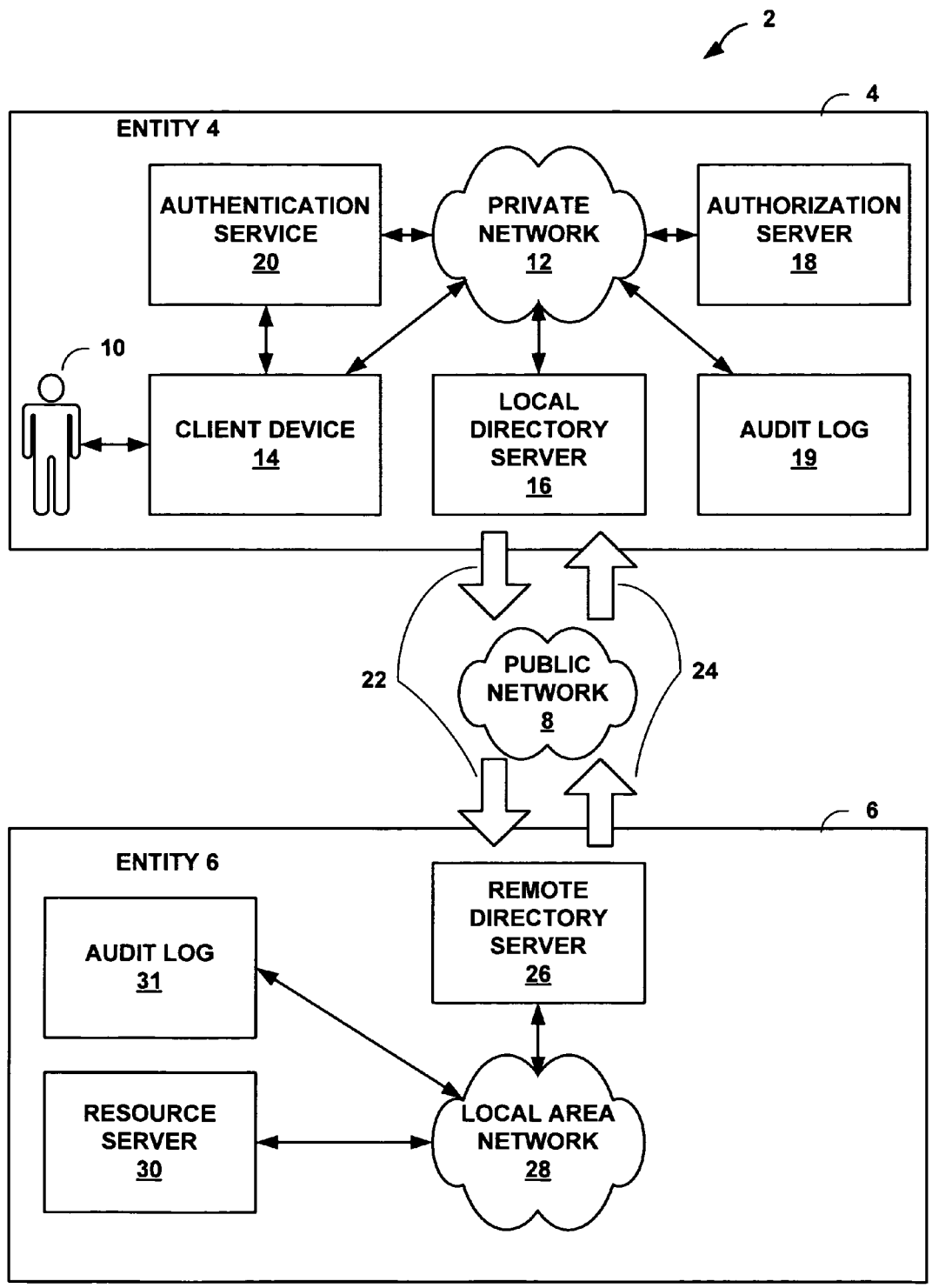
FIG. 1 is a block diagram illustrating an exemplary authorization assurance system in which an entity is using a private network.

FIG. 1 is a block diagram illustrating an exemplary authorization assurance system 2. Authorization assurance system 2 contains a first entity 4 and a second entity 6. Entities 4 and 6 represent any entity, family, organization, enterprise, company, business, corporation, or any legally defined enterprise that allows one or more agents to interact with network resources on behalf of the entity. In addition, entities 4 and 6 may be wholly independent of one another, not sharing common servers or secure authentication systems. Entities 4 and 6 communicate via public network 8. Public network 8 may be any wide-area network ("WAN") such as the Internet, a local area network, a metropolitan area network, a telephone network, or another type of computer network.

Entity 4 and entity 6 may enter into one or more agreements that define relationships between entities 4 and 6. In particular, the agreements may grant entity 4 rights to use network resources provided by entity 6. The agreements may also define how entity 4 may use the network resources and which types of agents may use the network resources. For example, an agreement between entity 4 and entity 6 may grant the president of entity 4 the right to purchase goods through a network resource provided by entity 6. In addition, the agreements between entities 4 and 6 may define one or more assurances that entities 4 and 6 must exchange when interacting with one another. For example, an agreement may require that entity 4 provide entity 6 with contact information of an agent initiating a proposed interaction with a network resource provided by entity 6. In this way, an agreement between entity 4 and entity 6 may define a standard of acceptability for the assurances for a network resource provided by entity 6 to entity 4.

As shown in FIG. 1, a client device 14, a local directory server 16, an authorization server 18, and an audit log 19 use private network 12 and authentication service 20 to communicate securely. Client device 14 may be any computing machine capable of authenticating agent 10 to authentication service 20. For example, client device 14 may be a personal computer, a server, a laptop computer, portable or handheld computing device, smart card, a system that contains a computing device, or another device capable of network communication.

Entity 4 contains at least one agent 10. Agent 10 may represent an employee, contractor, software program, family member, constituent, and so on. Entity 4 may authorize agent 10 to interact with a network resource provided by entity 6 on behalf of entity 4. In particular, agreements between entities 4 and 6 may describe a set of uniquely identified or named agent authorizations, and associated security parameters to one or more agent authorizations, that taken together describe powers granted by an entity to an agent and limitations on such powers. By uniquely identifying an agreed-upon set of agent authorizations with entity 6, entity 4 may then freely designate and also freely change designations for one or more of its agents, apportioning an appropriate subset of authorizations to its agents. Entity 6 is freed from requiring acquaintance with any particular agent of entity 4 and can rely entirely on accepting or rejecting the requested interaction by agent 10 based entirely on the merits of the agent authorizations with which entity 4 has "clothed" agent 10 in the course of the network communications. Pursuant to one or more agreements between entities 4 and 6, entity 4 may communicate the authorizations and parameters to entity 6 as an assurance that entity 4 has authorized an agent to interact with entity 6 on behalf of entity 4.

Several things must be true before agent 10 may use a network resource. First, entity 4 has established sufficient authentication credentials for agent 10. Second, agent 10 has asserted the initial use authentication credentials to the satisfaction of entity 4. Third, agent 10 sends and receives cryptographically authenticated messages while using private network 12. Entity 4 requires agent 10 to perform all of these authentications and possibly others successfully before allowing agent 10 to use private network 12 to use a network resource.

Entity 4 first establishes authentication credentials for each agent of entity 4. For example, entity 4 may establish a specific password "X" is acceptable proof that a user is agent 10. In this context, entity 4 controls the establishment of the initial use authentication credentials. For instance, entity 4 may determine password age, establish length and complexity requirements, require the use of biometric credentials, require the use of multiple credentials, and so on.

The authentication credentials may include a user name, a user unique identifier, a password, a one-time password, a biometric (e.g., a fingerprint or retina scan, etc.), a physical token, a card, a physical key used to unlock a tumbler-style lock, etc., or any other data or object that identifies a user as an agent of entity 4. In some circumstances, techniques other than authentication credentials may provide additional confidence in an authentication of an agent. For example, highly secured physical buildings or locations, armed guards, reinforced site construction, locked doors, or sequences of locked doors may be stronger measures of agent authentication than those listed above. Client device 14 may store some or all of the authentication credentials. If client device 14 stores the authentication credentials, then it would appear that entity 4 trusts agents that are in possession of client device 14, or alternatively, that possession of client device 14 proves that the agent is authentic. In any case, entity 4 controls the systems used for the authentication of agent 10 and is the judge of the acceptability of the proof provided to itself of initial use authentication of agent 10.

To use a network resource, agent 10 first uses an agent authentication system. Specifically, agent 10 supplies authentication credentials to client device 14. After receiving the authentication credentials, client device 14 forwards the authentication credentials to authentication service 20. Client device 14 may communicate with authentication service 20 using private network 12. Alternatively, client device 14 may communicate directly with authentication service 20 using a trusted communications channel such as a direct-cable connection, radio frequency transmission system, an alternate network, or other communications media.

Authentication service 20 may implement a Kerberos authentication system created by the Massachusetts Institute of Technology. If authentication service 20 implements the Kerberos authentication system, private network 12 may be a collection of domains organized hierarchically according to the Kerberos specification for cross-realm authentication. In such case, client device 14, local directory server 16, and authorization server 18 would be domain members of private network 12.

If authentication service 20 successfully authenticates the authentication credentials, authentication service 20 allows client device 20 to communicate with devices attached to private network 12. In other words, if authentication service 20 authenticates agent 10, agent 10 may subsequently use client device 14 to send a request for a network resource to any device on private network 12. Because communication on private network 12 is not possible without authentication service 20 first authenticating the authentication credentials supplied to client device 14 by agent 10, other devices attached to private network 12 reasonably presume that the request originated from agent 10.

To communicate securely on private network 12, devices exchange cryptographically authenticated messages. When a device on private network 12 receives a cryptographically authenticated message, the device may verify that the message was not altered during transit across network 12. In verifying that the message was not altered during transit, the device may also verify that a particular user sent the message. For instance, devices on private network 12 may use a system of encryption, keys and digital signatures to cryptographically authenticate the messages. Thus, the use of cryptographically authenticated messages on private network 12 minimizes the risk that a malicious user has altered a communication across private network 12.

Client device 14 uses local directory server 16 to interact with network resources. When authentication service 20 successfully authenticates agent 10 on client device 14, client device 14 sends an authentication notice and a request for a directory listing to local directory server 16. In response, local directory server 16 sends information to client device 14 regarding which network resources entity 4 has authorized agent 10 to use. The network resources may include local network resources provided by entity 4 and remote network resources provided by a different entity, such as entity 6.

When local directory server 16 receives a notification from client device 14 that authentication service 20 has successfully authenticated agent 10, local directory server 16 sends a query to authorization server 18 for all authorization records applicable to agent 10. The authorization records describe how agent 10 may interact with network resources. Local directory server 16 is confident that the returned authorization records actually apply to agent 10 because entity 4 requires that all devices on private network 12 cryptographically authenticate messages.

In particular, an authorization record may embody an agreement between entity 4 and another entity regarding a network resource provided by the other entity. If a unique identifier for an authorization record has been recited in an agency-resource agreement offered to entity 4, then the authorization record is a provider-named-privilege authorization record. An agency-resource agreement may include one or more of the following: a) a specification of at least one network resource offered by entity 6, specified by a URL; b) a specification of at least one provider-named-privilege used by entity 4 to authorize an agent, such that entity 4 must send this provider named privilege in instructions 22 issued by the agent before entity 6 accepts a request from the agent; c) a specification of named agent identity data to be sent with instructions 22 to help interpret instructions 22, and; d) a specification of security parameters to form a standard for the communications of instructions 22 and response 24. Entity 4 may define the provider-named-privilege in terms of uniquely identified privileges, roles, groups, clearances, designations, access levels, ranks, powers of attorney, supervisory functions, and so on.

Entity 4 is solely responsible for the content of the authorization records stored in authorization server 18. Thus, by creating an authorization record of any type, entity 4 explicitly grants an agent rights to act on behalf of entity 4. By creating a provider-named-privilege type of authorization record and by granting that right to an agent entity 4 further specifies an agent's rights in regards to a network resource controlled by entity 6. Further, the complete set of all agency-resource agreements between entity 4 and other entities govern what rights entity 4 may grant to an agent via provider-named-privileges. Authorization server 18 may store these authorization records in a Lightweight Directory Access Protocol ("LDAP") directory, an electronic file, a relational database, or other data storage structure.

In addition to authorizations records, entity 4 maintains identity information in association with its agents. Identity information may include computer-readable records of its agents' names, workplace or location information, email address, telephone number or numbers, employee identification number or similar identifier, title, job description or similar information, supervisor or manager, and so forth. Agent identity information may be stored in an accessible server on private network 12 such as authentication server 20, authorization server 18, local directory server 16, etc. In the illustrative authorization assurance system 2 shown in FIG. 1, the agent identity information is stored in local directory server 16.

Upon receiving applicable authorization records for agent 10, local directory server 16 attempts to match these with the access control records governing "hyperlink files" stored on local directory server 16. Local directory server 16 maintains hyperlink files in a file system using a discretionary access control method common to many operating systems such as Microsoft Corporation's Windows® operating system, Sun Microsystem's Solaris® operating system, International Business Machine's Resource Access Control Facility (RACF®), and many others. In general, discretionary access control methods employ lists called access control lists (ACLs) composed of access control entries (ACEs) which commonly contain unique identifiers for users or privilege groups or other authorizations known to the system. When agent 10 requests interactions with a hyperlink file, local directory server 16 attempts to match at least one applicable authorizations records of agent 10 to an access control list for the hyperlink file. Agent 10 may interact with a remote network resource by manipulating an associated hyperlink file. For example, agent 10 may send a request to read one or more documents at entity 6 by double clicking on the hyperlink file representing the document. As a second example, agent 10 may send a purchase order to entity 6 by dragging a completed order form onto a hyperlink file that represents an order processor of entity 6 when the operating system in use writes the completed order form to the hyperlink file.

An agreement between entities 4 and 6 may create the basis for providing a hyperlink file to an agent of entity 4. Specifically, the agreement may govern which hyperlink files local directory server 16 makes available to agent 10. For example, local directory server 16 obtains a computer-readable record of the agreement. Upon receipt of the agreement record, local directory server 16 ensures that the a) resources of entity 6, b) provider-named-privileges, c) identity data and d) security parameters recited in the agency-resource-agreement are faithfully reproduced in security parameters associated with the hyperlink file. For example, if the agreement specifies a resource provided by entity 6 and a provider-named-privilege, and pursuant to an agreement entity 4 creates a provider-named-privilege authorization record and grants agent 10 that right, then local directory server 16 ensures the following four reproductions remain accurate and faithful to the agreement. (A) Local directory server 16 associates the hyperlink file with the resource of entity 6. (B) Local directory server 16 ensures that so-called discretionary access controls allow authorized agents of entity 4 and prevent agents lacking the authorization granted by the provider-named-privilege specified in the agreement from accessing the hyperlink file. For example, the hyperlink file may employ an access control list (ACL) that specifies the provider-named-privilege that, in turn, controls which of agents of entity 4 may use a specific resource. (C) Local directory server 16 associates a list of identity data with the hyperlink file. Upon the occasion of a granted access request from an authorized agent of entity 4, local directory server 16 may retrieve a subset of identity data associated by entity 4 with the authorized agent. The subset of identity data is defined by an intersection of the list of identity data associated with the hyperlink file and the data stored within local directory server 16 for the requesting agent. (D) Further, the agreement may specify and control what actions local directory server 16 allows members of the provider-named-privilege groups, such as agent 10, to perform with a hyperlink file. Such limitations may be reflected using an ACL for the hyperlink file that corresponds to this agreement or by otherwise associating security parameters with the hyperlink file and processing those security parameters upon the occasion of a request for that hyperlink file. If the agency agreement does not permit a particular agent to perform any actions with a hyperlink file, local directory server 16 does not present the hyperlink file to agent 10. Because the agreement may grant some agents broader authorization than others, an implication is that local directory server 16 may present different lists of hyperlink files to different agents.

In addition, the agreement may provide contextual information for the hyperlink files. Local directory server 16 may use the contextual information as a source of configuration information and description information to enhance the presentation of hyperlink files to agents of entity 4 after first determining whether the agent has sufficient privileges as described above. For example, local directory server 16 may organize views of hyperlink files by the name or unique identifier of a second entity to an agreement. Further, local directory server 16 may use descriptions of the agreements, network services, authorizations, skills or qualifications required of an authorized agent, or any other information included directly or by reference in the agency agreements to determine which hyperlink files to present to agent 10 and to support and enhance the presentation, organization, annotation, categorization and other aspects of presenting these hyperlink files to agent 10. Local directory server 16 faithfully extracts the information in the agreement relevant to the presentation, organization, annotation, etc. of the file, summarizing this information into a format readable by itself specific to the hyperlink file associated with the resource, and in turn uses that information to modify its presentation of the hyperlink file to agents of entity 4.

Local directory server 16 may further enhance the hyperlink files by associating security and communications parameters in order to configure secondary processing activities that local directory server 16 may perform upon the occasion of a request to access a hyperlink file. The security parameters may instruct local directory server 16 to perform secondary processing including: recordation and storage of audit records, evaluation of the integrity of the software in use on local directory server 16, evaluation of the communications integrity and availability of private network 12, evaluation of the authentication methods used to authenticate the agent which has raised the occasion of this request, evaluation of the minimum quality of service provided by remote directory server 26, anti-virus scanning of the instructions 22 or response 24, evaluation of encryption methods in use on private network 12 protecting the messages between client device 14 and local directory server 16, transformations of the format of instructions 22 or response 24, and so on. The communication parameters may include data formatting requirements, file type associations for the instructions or the responses, transmission minimum quality of service parameters, message digest configuration parameters, and other communication-related specifications.

Local directory server 16 may present hyperlink files in a variety of ways depending on the security and convenience needs of entity 4. For example, local directory server 16 may interact with software on client device 14 to present the hyperlink files to agent 10 through a command line interface or a graphical user interface. The software on client device 14 may include file system browsers, web browsers, and the like. Further, local directory server 16 may organize hyperlink files in folders, directories, or containers. In addition, the graphical user interface may present the agent with context-specific menus, drag-and-drop functionality, icons and graphics, extended property windows, copy-cut-paste functionality, and "tool tip" windows that "hover," and so on. In particular, the software on client device 14 may be enhanced with additional buttons, viewing panes, menus, menu items, or additional processing instructions. Local directory server 16 may further enhance the command line interface or the graphical user interface by associating types of data files with executable software capable of reading or otherwise using those types of data files.

Local directory server 16 may present a "directory" listing or view of the hyperlink files available to entity 4 and its agents by agency agreements. The directory view allows agent 10 to see which resources entity 4 has authorized agent 10 to use. Further, the directory may present a summary of the network resources and the agreement upon which the resources are based. Moreover, the directory view may include graphical images and icons suitable to viewing and using resources. Local directory server 16 may arrange hyperlink files in various ways in the directory view. For example, the directory view may include hyperlink files sorted by category, hyperlink files that entity 4 considers preferred network resources, hyperlink files related to active agency agreements, hyperlink files related to all past and current agreements, hyperlink files associated with agreements held out to entity 4 but not currently accepted by entity 4, or some other designation or any combination thereof.

In addition, the directory view may show hyperlink files related to offered agreements that entity 4 has not currently accepted. Another entity may hold out such an agreement unilaterally. Alternatively, the other entity may offer the agreement unilaterally but with some criteria of entity selection, the other entity may hold out the agreement bilaterally to entity 4, and so on. In any case, local directory server 16 may make agreements offered to entity 4 and digitally signed by the offering entity available. In creating the directory view, local directory server 16 may search signed offers the local directory server has received. In addition, local directory server 16 may actively obtain offers for network resources. Further, in creating the directory view, local directory server 16 may exclude documents where a signature is invalid, documents where a signing certificate is expired or dishonored, or documents failing to fulfill some other filtering criteria.

In addition, local directory server 16 could interact with one or more servers to display the hyperlink files to agent 10. For example, local directory server 16 may provide the hyperlink files to a web page server for presentation as web pages to users of private network 12. In addition, local directory server 16 may provide hyperlink files representing remote mailboxes to an email server. In this case, agent 10 may use the remote mailboxes as if the mailboxes were resources on private network 12.

In order to maximize compatibility with a wide variety of software and existing technologies that commonly use computer files and file systems, a programmer may write a software implementation for local directory server 16 in part or in whole as a file system or file system device driver. This method of implementation may have compatibility advantages over other methods because of the long history of using file systems with computing systems to secure access to computer resources.

After transmitting the list of hyperlink files to client device 14, local directory server 16 may receive a request to interact with a remote network resource. In response to the request, local directory server 16 may create a set of instructions 22. Instructions 22 contain communication parameters, entity authentication information, a request for a remote network resource, and assurances that entity 4 authorized agent 10 to send to request on behalf of entity 4. After creating instructions 22, local directory server 16 securely forwards instructions 22 to remote directory server 26 in entity 6.

The communication parameters in instructions 22 instruct local directory server 16 and remote directory server 26 how to maintain the confidentiality and integrity of the instructions 22 during transmission over public network 8. The communication parameters may also invoke clauses of an agreement of entity 4 with entity 6 in order to instruct or promise regarding the transmission, retention, safe handling, quality of service, status, or other security attribute associated with these particular instructions 22. When transmitting instructions 22, local directory server 16 may use a method that proves that local directory server 16 possesses a private key belonging to entity 4, that instructions 22 were not altered during transmission, and that instructions 22 were not read during transmission by an intercepting party. For example, local directory server 16 and remote directory server 26 may communicate using a transport layer security plus identification ("TLS+ID") protocol. The TLS+ID protocol allows local directory server 16 and remote directory server 26 to communicate instructions 22 and other communications securely. Because local directory server 16 and remote directory server 26 communicate using a secure protocol, local directory server 16 may be confident that remote directory server 26 correctly received instructions 22. For the same reason, local directory server 16 may be confident that a response received by the local directory server was the response sent by remote directory server 26. Therefore, entity 4 can fairly consider remote directory server 26 to act as entity 6.

When remote directory server 26 receives instructions 22, remote directory server 26 analyzes the authentication information in instructions 22 to authenticate entity 4. In other words, remote directory server 26 authenticates entities, not particular agents of the entities. Thus, from the perspective of entity 6, entity 4 is sending instructions 22 directly and agent 10 is incidental to the transmission. For this reason, agent 10 does not have to supply authentication credentials to entity 6. This maintains both entities' desire for security because entity 4 has authenticated the identity of agent 10 and has authorized agent 10 to act on behalf of entity 4. Moreover, because entity 6 does not need to authenticate agent 10 directly, authorization assurance system 2 saves time for agent 10 and simplifies the use of remote network resources. Because entity 6 does not need to authenticate agent 10 directly, entity 6 may be relieved of the burden of maintaining records concerning agents of entity 4. Furthermore, because entity 6 does not authenticate agents directly, entity 6 does not need to provide network infrastructure to authenticate agents. In particular, entity 6 does not need to maintain an authentication record for each agent that an entity may authorize to interact with entity 6. For this reason, entity 6 is not liable if the authentication record is out-of-date Also, entity 6 does not need to maintain authentication credentials nor personal identity information for agents like agent 10. As a result, entity 6 cannot be held liable for safeguarding information or improperly disclosing authentication credentials or personal identity information that entity 6 does not possess.

Remote directory server 26 may use public key certificates (PKCs) to authenticate entity 4. For instance, a certificate authority trusted by entities 4 and 6 may issue one or more PKCs to entity 4. When local directory server 16 sends instructions 22, local directory server 16 selects a PKC that is most appropriate for given set of instructions 22 and response 24. Further, a mutually trusted certificate authority that vouches for a PKC may require that entity 4 apply one or more usage policies or programs to the PKCs. To allow for such usage policies and programs, the PKCs may include attributes and extended attributes that assist entity 4 in managing and selecting certificates.

To assist in the management and selection of PKCs, entity 4 may classify PKCs into different types and purposes. Classifying PKCs may simplify specifications used in agreements between entities 4 and 6 used with authorizations assurance system 2. For example, a PKC may include a fully qualified domain name of local directory server 16. Where possible, the fully qualified domain name binds local directory server 16 to a Kerberos realm or domain in which local directory server 16 operates. In another example, a PKC may include a maximum usage number. The mutually trusted certificate authority may use the maximum usage number to limit the number of times that local directory server 16 may use the PKC to initiate instructions 22. In a third example, a PKC may include a name of an insurance underwriter and a terse description of an insurance policy purchased by entity 4 to protect itself and/or instructions initiated using the PKC. In a fourth example, a PKC may include a security identifier that represents a specific range of acceptable security parameters. The security identifier may limit use of the PKC by entity 4 to only those network services and associated agreements that match the specified configuration or range. Further, a PKC may include one or more legal identifiers representing information security laws, regulations, or requirements that govern security of instructions 22 and responses 24. By including legal identifiers in a PKC, the mutually trusted certificate authority indicates that entity 4 may only use the PKC with parties prepared to do business under implied jurisdiction of the indicated law. In a fifth example, more than one mutually trusted certificate authority may vouch for a PKC. This may increase the likelihood that the PKC authentically relates to entity 4.

If remote directory server 26 successfully authenticates entity 4, remote directory server 26 analyzes the request to interact with the network resource of instructions 22. Specifically, remote directory server 26 determines whether entity 6 has authorized entity 4 to interact with the resource specified in instructions 22 in a manner pursuant to an agency agreement between entities 4 and 6. Remote directory server 26 may record the results of this determination in audit log 31. Entity 6 is solely responsible for the results of the determination. Thus, entity 6 is solely responsible if an agreement requires entity 6 to accept the request and entity 6 determines not to accept the request. Similarly, entity 6 is solely responsible if entity 6 accepts a request for which no valid and enforceable agency-resource agreement exists.

After entity 6 has authenticated the entity initiating the interaction request, remote directory server 26 analyzes the authorization assurances in instructions 22. Authorization assurances assure entity 6 that entity 4 has authorized agent 10 to send the interaction request in instructions 22 on behalf of entity 4 in regards to entity 6. These assurances may take several forms and should faithfully represent the agreement between the two entities. At the same time, entity 6 maintains a faithful representation of the agency-resource-agreement between the two entities in a computer-readable format, one for each resource that it provides via such an agreement. For each such resource entity 6 maintains a) a resource unique name or identifier, b) a list of all provider-named-privileges that grant access to the resource which may be maintained in an access control list, c) a list of identity data it allows and or demands, and d) security parameters recited in the related agency-resource-agreements. By maintaining faithful representations of agency-resource-agreements that entity 6 has offered or entered into, in a format optimized for remote directory server 26's use, entity 6 thereby maintains a precise record of instructions 22 that entity 6 is prepared to accept. If remote directory server 26 receives any instructions not issued by an authenticated entity in good standing, to whom directory server 26 has either offered or entered into agency-resource agreement, remote directory server 26 may reject such instructions. Further, if remote directory server 26 receives any instructions that do not conform to the specifications of an applicable agency-resource agreement for the requested resource, remote directory server 26 may reject such instructions. Therefore, remote directory server 26 may be readily configured to accept only those instructions where the authorizations assurances prove that the instructions have prior approval both by entity 4 and at the same time by entity 6, pursuant to an agency-resource agreement. This security posture mitigates many active attacks employed for example against Internet accessible servers and firewalls.

The assurances may comprise agent authorization information. The authorization information may describe rights granted by entity 4 to agent 10 to act on behalf of entity 4 with respect to entity 6. Specifically, these rights may be conferred to an agent of entity 4 only if all other aspects of the instructions are acceptable to entity 6 pursuant to the agency-resource-agreement between these two entities. For example, the agent authorization information may express a list of provider-named-privileges that entity 4 has authorized agent 10 to possess. Upon receipt of such agent authorization information, remote directory server 26 may compare the agent authorization information with authorization information stored by remote directory server 26. Specifically, remote directory server 26 may check the agent authorization information against an access control list related to the specific resource identified and requested in instructions 22. If the agent authorization information shows that entity 4 has authorized agent 10 to act on behalf of entity 4, e.g., that agent 10 possesses one or more of the provider-named-privileges listed in the relevant access control list, remote directory server 26 may comply with the remote resource request. Like the agent identification information, remote directory server 26 may record the agent authorization information in audit log 31 or pass agent authorization information through to other devices or entities.

Entity 6 may use the agent authorization information as evidence that entity 4 authorized agent 10 to send instructions 22. For example, suppose that entity 6 has defined the meaning, rights, restrictions, and responsibilities of agents vested with the authorization "entity 6, office managers" in an agency agreement signed by entities 4 and 6 prior to the transmission of agent authorization message 442. When entity 6 receives the agent authorization information that specifies that agent 10 is a member of the "entity 6, office managers" group, entity 6 may store the agent authorization information in audit log 31. If a dispute arises later, entity 6 can use agent authorization information and other authorization assurances to prove that entity 4 put agent 10 in the "office managers" group as defined in the agency agreement signed by entities 4 and 6. Hence, entity 6 can prove that entity 4 and only entity 4 authorized agent 10 to act on behalf of entity 4 in the capacity of an office manager as specifically defined by entity 6. Therefore, the presence of agent authorization information in instructions 22 could reduce fraud and simplify potential litigation regarding instructions 22.

The assurances may also comprise agent identity information. Such information may include any of the name-value pairs described above or countless other name-value pairs that may be useful to one or both of the parties to the agency-resource-agreement. These name-value pairs may be defined precisely in the agency-resource-agreement initially offered by entity 6 and therefore initially defined by entity 6. Because entity 6, the offering entity, first defines and creates names for these name-value pairs, this identity information may be named after entity 6 to indicate precisely whose definition of the name-term is in use. For example, entity 6 may require pursuant to its agency-resource-agreement that entity 4 configure local directory server 16 to send agent identification information to remote directory server 26 in instructions 22. The agent identification information may include information about agent 10 or entity 4. For example, the agent identification information may express the contact information, location, established preferences, title, department, or other information about agent 10. Further, the agent identification information may express requirements that can assist entity 6 in the interpretation of the instructions 22. In addition, the agent identification information may express some additional authentication credentials of agents of entity 4 not required by system 2 but desirable for reasons of convenience, compatibility, and so on.

Upon receipt of the agent identity information, remote directory server 26 may perform several tasks. For example, remote directory server 26 may check the agent identity information and only comply with instructions 22 if entity 6 approves the agent identity information. Remote directory server 26 may also store the agent identification information in an audit log 31. Entity 6 may use the agent identification information stored in audit log 31 as evidence concerning an agent that was responsible for initiating instructions 22. In addition, entity 6 may pass agent identification information through to one or more network devices or other entities, e.g., resource server 30. An applicable agreement between entity 4 and entity 6 may govern such distribution of agent identification information.

In addition, entities 4 and 6 may use a combination of agent identity information and agent authorization information to reduce fraud. For example, agent authorization information may specify that entity 4 has named an agent as a member of "entity 6, office managers," as a provider-named-privilege In addition, agent identity information may identify the agent as managing an "entity 6, office number: 110." Both of these examples are provider-named. That is, the names are prefixed by the entity that defined them. Alternatively, both privileges and agent identity information may be named using object identifiers following established standards, including for example object identifiers and enterprise numbers managed by the Internet Assigned Numbers Authority or those managed by American National Standards Institute. If such an authenticated and authorized agent initiated a purchase order for a location other than "entity 6, office number: 110", then entity 6 could more easily flag such a request as potentially fraudulent. As a further example, entity 6 could use a time and date field and a specific network resource name in instructions 22 in combination with agent authorization information to prove that entity 4 had authorized agent 10 to send the interaction request of instructions 22 pursuant to an agreement in force between entities 4 and 6 at the time agent 10 sent instructions 22. Further review of the contents of instructions 22 in light of this definite, specific, and evidentiary context may lead to stronger conclusions about the presence or absence of fraud in any particular case.

After determining whether 6 accepts the interaction requested in instructions 22 and the authorization assurances, remote directory server 26 may send a response 24 to local directory server 16 pursuant to an agreement between entities 4 and 6. Response 24 may express whether entity 6 accepts or rejects the interaction request of instructions 22. Local directory server 16 may store response 24 in audit log 19. Later, entity 4 may use response 24 as evidence that entity 6 accepted or rejected the interaction request. This could be useful to entity 4 if entity 6 first accepts the interaction request and later refuses to perform the interaction. This may also be useful to entity 4 to prove the timeliness of instructions 22 to entity 6, both that the instructions were sent and that they were received by entity 6.

If entity 6 accepts the interaction request, remote directory server 26 determines the location of the remote network resource identified by instructions 22. For example, remote directory server 26 may determine that a file stored on resource server 30 is the remote network resource requested in instructions 22. In another example, remote directory server 26 may provide instructions 22 as input to a network resource executing on resource server 30. After locating the network resource, remote directory server 26 delegates or forwards the interaction request portion of instructions 22 to resource server 30. Resource server 30 then complies with and performs the interaction requested in instructions 22.

To enter into an agreement that defines how entity 4 may interact with resources provided by entity 6, entity 4 may receive an electronic copy of an agreement via email, fax, etc., or receive a paper copy of an agreement via mail, personal delivery, courier, and the like. Entity 4 may subsequently endorse, initial, or sign, the paper copy of the agreement. Entity 4 may then convert the paper copy into digital format and return the digital copy of the agreement to entity 6. Forming an agreement may subsequently require entity 4 to update the authorization records in authorization server 18 manually. In addition, entity 6 may need to configure remote directory server 26 to reflect the agreement.

Entity 4 may also enter into an agreement automatically. To enter into an agreement automatically, local directory server 16 obtains a digitally signed document containing an offer to form an agreement from an entity. For instance, local directory server 16 may obtain a computer-readable document containing an offer to form an agreement after sending instructions 22 to obtain such a document and receiving response 24. For example, entity 4 may have configured a hyperlink file with an entity subject to an agreement with the entity that describes a network resource that offers agreement query services. When agent 10 uses the configured hyperlink file, local directory server 16 sends instructions 22 to remote directory server 26. In response, remote directory server 26 provides a suitable list of offered agreements to agent 10 within response 24. Agent 10 may then review the terms of the offered agreement. Agent 10 may indicate acceptance of the offered agreement by digitally signing the document on behalf of entity 4. In particular, agent 10 may indicate assent by editing the document to add initials, name, a graphical representation, a signature, and so forth, or by marking a check box, or by some other means. Digitally signing the document legally binds entity 4 to the terms of the offered agreement. After digitally signing the document, agent 10 transmits the signed document to entity 6. Agent 10 may use a hyperlink file provided by local directory server 16 to digitally sign and transmit the document to entity 6 as instructions 22.

Upon receipt of the digitally signed document, entity 6 may check the document and its digital signature to ensure that the document contains a binding agreement with entity 4. If entity 6 successfully validates the digitally signed document, entity 6 may store the document in remote directory server 26. In addition, entity 6 may configure remote directory server 26 to accept instructions 22 and to provide responses 24 to entity 4 pursuant to the agency agreement contained in the digitally signed document. In this way, entity 4 may enter an agreement with entity 6 by sending instructions 22 to entity 6. Entity 6 may comply with instructions 22 by accepting the agreement as binding upon entity 4 and entity 6.

Authorization assurance system 2 may present one or more advantages to entities 4 and 6. As explained above, authorization assurance system 2 simplifies and streamlines the experience of agent 10 by eliminating the need for agent 10 to supply authentication credentials to entity 6. By the same principle, authorization assurance system 2 may save entity 6 from expenses associated with creating accounts for agents of outside entities. As long as entity 6 knows that the other entity uses authorization assurance system 2, entity 6 does not need to know anything about agents of the other entity prior to receiving instructions 22.

Through the authentication and authorization process, entity 4 assures itself that an agent cannot interact with a network resource without the prior authorization of entity 4. In addition, the authentication and authorization process ensures that an agent of entity 4 cannot interact with a network resource in a manner that does not conform to an agreement between entity 4 and an entity providing the network resource. Moreover, entity 6 may require entity 4 to certify to the satisfaction of entity 6 that entity 4 routinely authenticates agents, prevents agents from accessing hyperlink files without authorization, and cryptographically authenticates communications on private network 12. For these reasons, the authentication and authorization process provides entity 6 with a high level of assurance that entity 4 cannot repudiate an interaction on the basis that entity 4 did not authorize the agent to perform the interaction.

More importantly, authorization assurance system 2 may increase the accountability of entity 4 and 6 to the rule of law and decreases the likelihood that either entity will repudiate a contract formed via an interaction over a public network. For example, by recording communications in audit logs 19 and 31, authorization assurance system 2 provides an evidentiary record of interactions between entities 4 and 6. This evidentiary record may be important if a contract dispute arises between entities 4 and 6. For example, suppose agent 10 uses a remote network resource provided by entity 6 to purchase goods. If entities 4 and 6 have entered an agreement to use authorization assurance system 2, entity 6 knows that agent 10 is acting on behalf of entity 4 because of the authentication and authorization process. Moreover, by storing the agent identification and agent authorization information sent with instructions 22 in audit log 31, entity 6 retains strong evidence of who or what agent 10 is and whether or not entity 4 authorized agent 10 to purchase goods. Because of this evidence, entity 6 can be more confident that entity 4 will not repudiate the purchase of goods.

Authorization assurance system 2 may be adaptable to a wide variety of existing technologies. For example, instead of transmitting a fax-compatible file via a modem device that has initialized a connection to the remote fax machine using a telephone number, agent 10 could copy the fax-compatible file "onto" a file named after the telephone number and managed by local directory server 16. In this way, authorization assurance system 2 assures confidentiality of document during transmission, mutual non-repudiation of transmission, capability to improve speed of transmission, and capability to automate the routing of documents upon receipt. The establishment of agents as legally authorized agents for their entity enables improved security and trust related to transmissions. For each of these reasons, sending a fax through authorization assurance system 2 can provide advantages relative to sending a fax with a conventional fax machine. Similar reasoning applies in regards sharing documents with the file transfer protocol ("FTP"), a peer-to-peer protocol, and simple mail transfer protocol ("SMTP").

The enhanced accountability inherent in authorization assurance system 2 can also enhance security in other communications media. For example, agents of entities could use authorization assurance system 2 in conjunction with Voice over Internet Protocol ("VoIP") and associated signaling protocols to hold private telephone conversations. Authorization assurance system 2 may also be used with a plethora of other communications technologies including secure shell ("SSH"), hypertext transfer protocol ("HTTP"), domain name service ("DNS"), network file system ("NFS"), and encrypted backup.

Entities 4 and 6 may also apply authorization assurance system 2 to electronic funds transfers. For example, suppose that entity 4 owns bank account A and bank account B. In this case, agent 10 may request that local directory server 16 send instructions 22 that instruct entity 6 to transfer $5000 from bank account A to bank account B. Upon receiving the electronic funds transmission information remote directory server 26 may accept the transfer of funds as specified and accept responsibility for the timely execution of the transfer.

Figure 2:
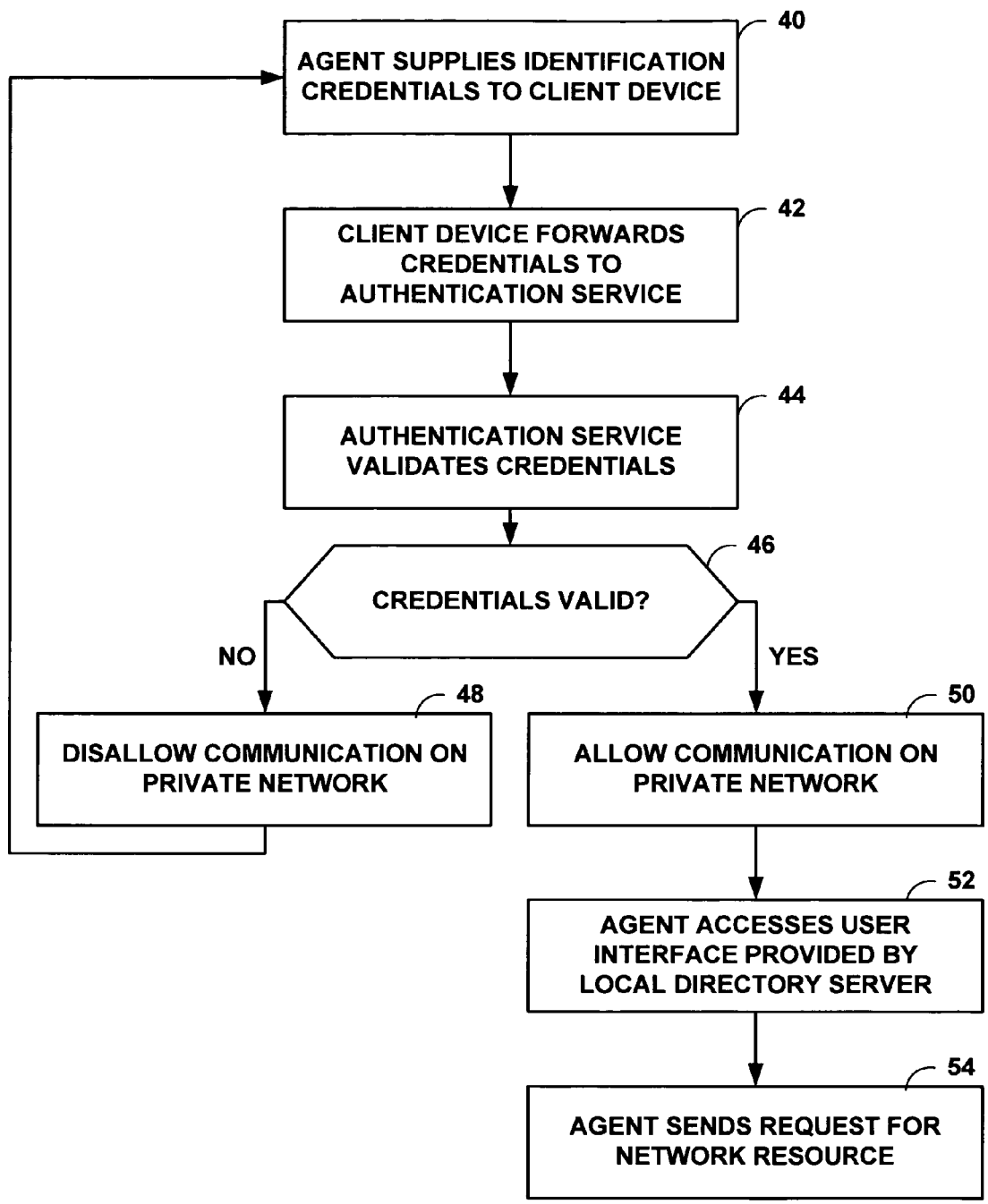
FIG. 2 is a flowchart illustrating an exemplary series of steps used to authenticate an agent.

FIG. 2 is a flowchart illustrating an exemplary process by which authorization assurance system 2 of FIG. 1 authenticates an agent according to an embodiment of the invention. Initially, agent 10 supplies one or more authentication credentials to client device 14 (40). As discussed above, the authentication credentials may include passwords, one-time passwords, various kinds of tokens that prove possession of a unique object, and biometric measurements including fingerprint, retina, hand, face, DNA, tattoos, and other credentials. Client device 14 then forwards the authentication credentials to authentication service 20 (42).

Authentication service 20 validates the authentication credentials against a stored set of authentication credentials (44). In particular, authentication service 20 may use one or more authentication technologies to validate the authentication credentials. For example, authentication service 20 may validate the authentication credentials using Kerberos-derived network authentication technologies, operating system-based authentication technologies, X.509 public key certificate-based authentication technologies that may or may not integrate with Kerberos or operating system authentication technologies, network authentication services that use encrypted sessions and/or encrypted cookies, and other authentication technologies.

If authentication service 20 cannot validate the authentication credentials (46), authentication service 20 disallows client device 14 from communicating with any device on private network 12 other than authentication server 20 (48). However, agent 10 may supply authentication credentials to client device 14 again (40). On the other hand, if authentication service 20 successfully validates the authentication credentials (46), authentication service 20 allows client device 14 to communicate with other devices on private network 12 (50). After successfully authenticating, client device 14 uses strong encryption methods to communicate with other devices on private network 12. The use of strong encryption methods preserves the agent authentication. Agent 10 may thereby avoid repetitive requests to authenticate so long as agent 10 continues to send requests and instructions to resources on private network 12. For example, if private network 12 is a Kerberos domain network, authentication service 20 supplies client device 14 with an encryption key that allows client device 14 to encrypt and decrypt communications in private network 12.

If authentication service 20 allows client device 14 to communicate through private network 12, agent 10 may access local directory server 16 through private network 12 (52). In particular, client device 14 sends an authentication notification and a request for a directory listing to local directory server 16. In response, local directory server 16 may provide one or more hyperlink files to client device 14. Agent 10 may then use one of the hyperlink files to send a request to a remote network resource using local directory server 16 (54).

Figure 3:
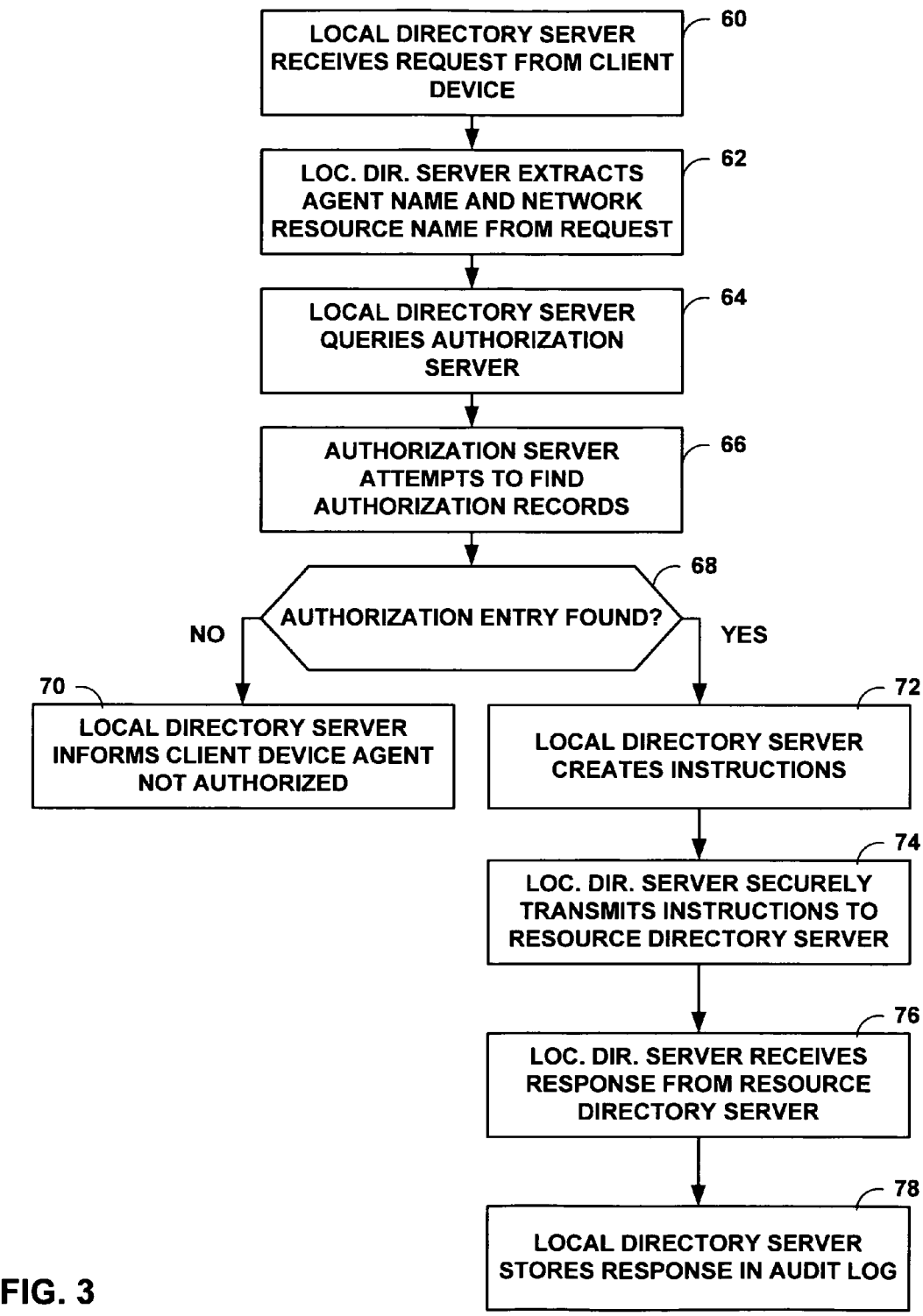
FIG. 3 is a flowchart illustrating an exemplary series of steps used to verify whether an entity has authorized an agent to interact with a remote network resource on behalf of the entity, and to transmit and receive instructions and assurances pertaining to the remote network resource.

FIG. 3 is a flowchart illustrating an exemplary series of steps used to verify whether an entity has authorized an agent to interact with a remote network resource on behalf of the entity, and to transmit and receive instructions and authorization assurances pertaining to the remote network resource. A local authorization process begins when local directory server 16 receives a cryptographically authenticated authentication notification from client device 14 (60). Because client device 14 cryptographically authenticates the request, local directory server 16 can understand the contents of the request after decryption only when the request originated from agent 10.

After receiving the authentication notification and request for directory listing, local directory server 16 extracts a username or user identifier of agent 10 (62). This username, Kerberos Principal, or user identifier uniquely identifies a person or agent within the context of private network 12. Entity 4 or its delegate may durably assign such a user identifier to and associate with agent 10. For simplicity, this username or unique identifier will be referred to herein as the agent username.

Figure 5:
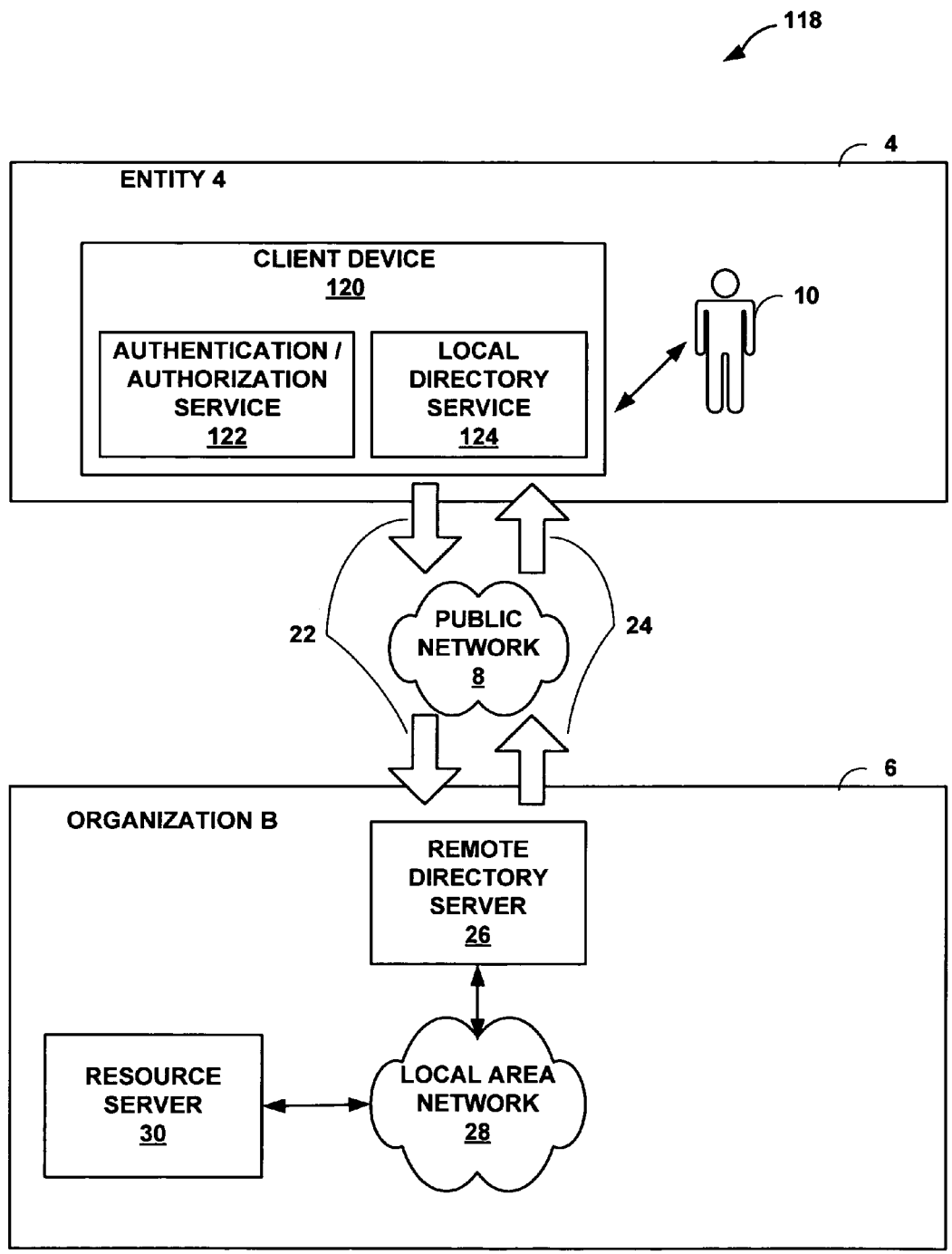
FIG. 5 is a block diagram illustrating a second embodiment of an authorization assurance system that does not use a private network.

The sequence of (64) may vary based on the specific implementation of private network 12; in some cases the query for a username's authorization records (64) may occur earlier, for example when the authentication server allows communication on private network 12 (50). In many cases, it is acceptable to entity 4 to query authorization server 18 immediately after username authentication is successful (50) and to maintain a cache of the resulting authorization records. However, if the implementation does not use a cache or currently requires an authoritative refresh of the authorization records of the username, then local directory server 16 sends a cryptographically authenticated query containing the agent username to authorization server 18 (64). Because local directory server 16 cryptographically authenticates the query, authorization server 18 can only understand the query when local directory server 16 sent the query. For this reason, authorization server 18 may be confident that the agent username in the query has not been altered during transmission across private network 14. In some embodiments of private network 12, some or all of local directory server 16, authorization server 18, audit log 19 and authentication service 20 may reside on the same server (not shown). In such cases the stringency of cryptographic messaging between these components may be relaxed or omitted at the discretion of entity 4, based on its judgment of trust in the messaging between components that reside on the same server. An example of this is shown in FIG. 5 below.

After sending the query, local directory server 16 may receive one or more authorization records from authorization server 18 applicable to agent 10 (66). If private network 12 uses Kerberos v5, local directory server 16 may translate the authorization records to complete a Kerberos Authorization-Data field. If Kerberos v5 and its Authorization-Data field are in use by private network 12, local directory server 16 then transmits a Kerberos ticket-granting-ticket containing the Authorization-Data field to client device 14 for client device 14 to store as an authoritative cache of its own authorization. Local directory server 16 may alternatively cache the authorization records associated with a username received from authorization server 18 in some other manner convenient or preferred by local directory server 16 or compatible with private network 12.

Local directory server 16 may then further examine the request received from client device 14 to interact with a network resource through a hyperlink file (60) by attempting to find any matching authorizations between the authorization records applicable to agent 10 and the authorization records associated with the requested resource (66). After receiving the request, local directory server 16 may check an authorization record list associated with the hyperlink file, for example an access control list associated with the hyperlink file. If local directory server 16 finds such a match such that one or more authorizations are found in both the authorization record list of the agent and the authorization record list of the hyperlink file (68), then the request is considered by local directory server 16 to be authorized by entity 4. Match process (66) ensures that entity 4 has authorized agent 10 to interact with the request network resource in the way requested by agent 10. If match process (66) does not find a matching authorization entry (68), then local directory server 16 informs client device 14 that the agent 10 is not authorized to make this request. Otherwise, local directory server 16 then creates instructions 22 embodying the request from agent 10 (72). If required by entity 6, local directory server 16 includes authorization assurances in instructions 22. If required by entity 6, local directory server 16 queries its records of identity information of agent 10, and creates the intersection set of the sum of the agent's identity information and the sum of identity information of entity 4 with the set of identity information either required or desired by entity 6 in association with this hyperlink file. Following this computation, local directory server 16 includes identity information assurances in instructions 22. If any security or communications parameters associated with this hyperlink file require secondary processing or evaluation by local directory server 16 on the occasion of this particular request, this is performed. If required by entity 6, local directory server 16 includes the results of the evaluation or secondary processing as parameter assurances in instructions 22.

After local directory server 16 creates instructions 22, local directory server 16 securely transmits instructions 22 to remote directory server 26 in entity 6 (74). In order to transmit instructions 22 securely, local directory server 16 may use the transport layer security+identification ("TLS+ID") protocol outlined below. If entity 4 requires a response for instructions 22, local directory server 16 may receive response 24 from remote directory server 26 (76). Local directory server 16 may then store response 24 in audit log 19 (78).

Figure 4:
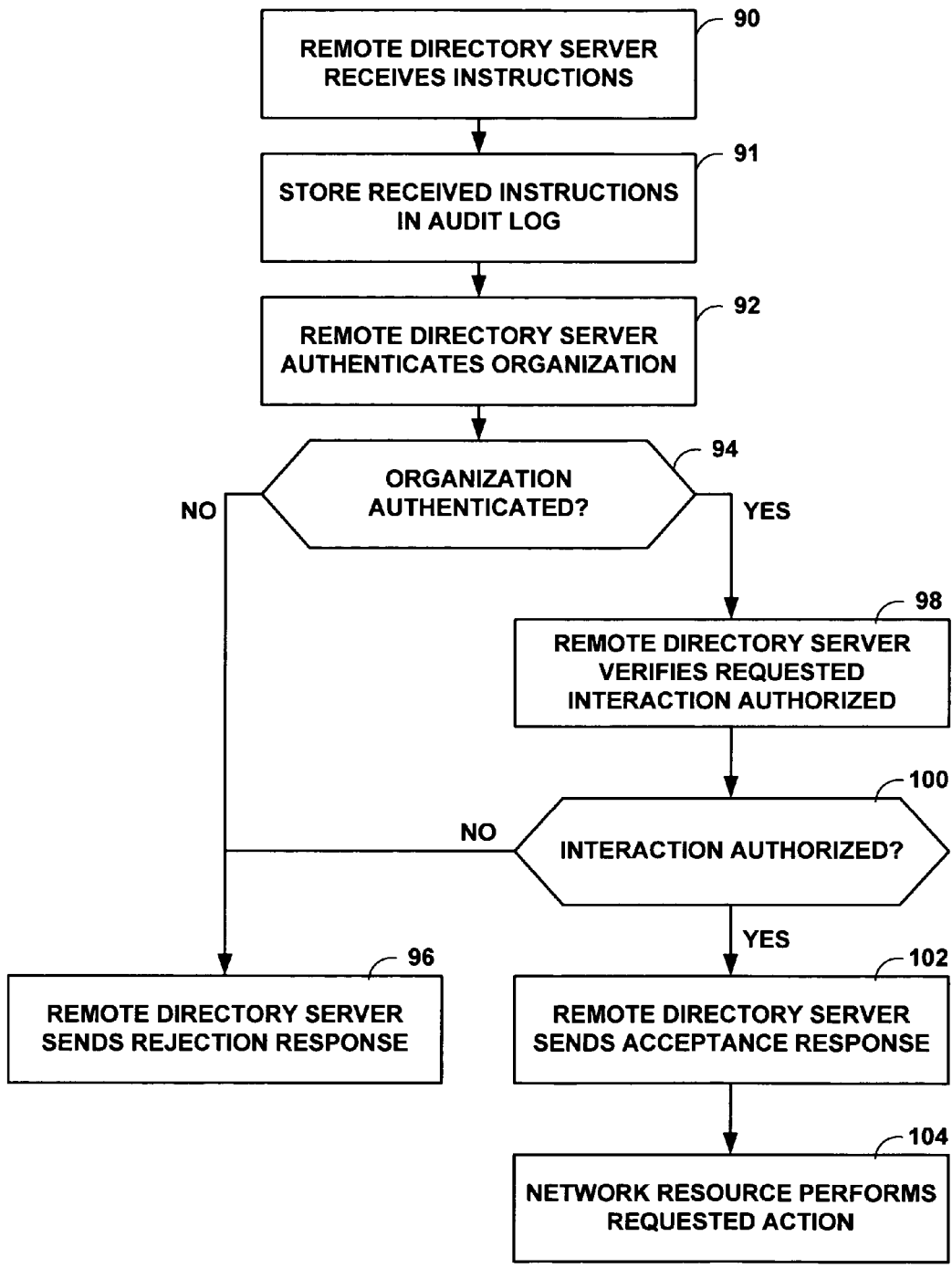
FIG. 4 is a flowchart illustrating an exemplary series of steps that handle a remote network resource request.

FIG. 4 is a flowchart illustrating an exemplary process that occurs when remote directory server 26 receives instructions 22. The process begins when remote directory server 26 receives instructions 22 from local directory server 16 (90). Resource directory server 26 may store instructions 22, including agent identification and authorization information, in audit log 31 (91). Audit log 31 may be encrypted to preserve the confidentiality of this information. One method of encryption for audit log 31 is to preserve the encrypted format in which instructions 22 were received from entity 4, and to preserve the session key for these instructions in order to decrypt them later. The session key may be preserved by encrypting the session key with the public key of the PKC of remote directory server 26, i.e., the PKC in use for this transaction. Remote directory server 26 then authenticates the entity that sent instructions 22 (92). In this case, entity 4 sent instructions 22. Remote directory server 26 may authenticate entity 4 by examining a certificate vouched for by a mutually trusted third party. Specifically, remote directory server 26 checks whether the examined certificate has expired or the mutual trusted third party has marked the certificate as dishonored by its owner. Entity 6 may further configure remote directory server 26 to refuse to authenticate any certificate that does not correspond to the finite list of parties to one of its existing agency-resource-agreements. If remote directory server 26 cannot authenticate entity 4 (94), remote directory server 26 sends a rejection response 24 to local directory server 16. That is, if remote directory server 26 cannot validate the certificate, remote directory server 26 indicates that entity 6 does not intend to comply with instructions 22. On the other hand, if remote directory server 26 is able to authenticate entity 4 (94), remote directory server 26 may decrypt part or all of instructions 22 using an encryption key contained in the examined certificate.

Remote directory server 26 then verifies that entity 6 has authorized the interaction requested in instructions 22 (98). For instance, remote directory server 26 may check whether entity 4 has demonstrated that entity 4 has authorized agent 10 to perform the interaction requested in instructions 22 on behalf of entity 4. In addition, remote directory server 26 may check whether instructions 22 conform to an agency-resource-agreement in place between entities 4 and 6. If entity 4 has not demonstrated to remote directory server 26 that entity 4 has authorized agent 10 to send instructions 22 or if instructions 22 otherwise do not conform to the agreement, entity 6 may send a rejection response 24 disallowing instructions 22. For example, remote directory server 26 may send a rejection response 24 when instructions 22 request a level of service, audit, encryption, or confidentiality regarding further processing of instructions 22 that is outside of a range of security parameters defined in an agreement between entities 4 and 6. In another example, suppose that instructions 22 instruct remote directory server 26 to store a complete audit record of instructions 22 and response 24 for 10 years. However, an agreement between entities 4 and 6 only requires that entity 6 store a complete audit record for 30 days. In this case, remote directory server 26 may send a rejection response 24 to entity 4. In another example, suppose entity 4 has entered into an agreement with entity 6 that specifies one or more provider-named privileges for agents of entity 4, e.g., vice presidents. Pursuant to this agreement, entity 6 may limit exercise of a power of attorney to agents that entity 4 has identified as vice presidents in instructions 22.

If remote directory server 26 determines that entity 6 does not authorize the interaction requested in instructions 22 (100), remote directory server 26 may send a rejection response 24 (96). By sending a rejection response 24, entity 6 indicates to entity 4 that entity 6 does not allow the requested interaction. However, instead of sending rejection response 24, entity 6 may allow the request using a different communication protocol, e.g., TLS/SSL. In another alternative, entity 6 may allow the request to continue using the current communication protocol (i.e., TLS+ID). However, in this case, entity 6 may require that entity 4 construe the request as taking place within the context of a unilateral agreement or consent offered by entity 6 and that the interaction does not occur within the context of a bilateral agreement between entities 4 and 6. Remote directory server 26 could send these and other variations of the meaning of the rejection response to local directory server 16.

If remote directory server 26 determines that entity 6 has authorized the requested interaction (100), remote directory server 26 allows the interaction to occur. In other words, if entity 4 has demonstrated to remote directory server 26 that entity 4 has authorized agent 10 to send instructions 22 and if instructions 22 conform to the agreement, remote directory server 26 allows the interaction to occur. Further, resource directory 26 may send a resource response 452 to local directory server 16 notifying local directory server 16 that entity 6 accepts the request (102).

After sending response 24, remote directory server 26 may locate a device on LAN 28 that hosts the requested resource. If remote directory server 26 decides that the resource is located on resource server 30, remote directory server 26 forwards the request to interact with the network resource to resource server 30. Resource server 30 then performs the requested interaction (104). Following the processing of the requested interaction (104) contained in instructions 22, resource directory 26 may send a response 24 to local directory server 16 containing resource server 30's response and secured by the authorizations assurance system 2.

FIG. 5 is a block diagram illustrating a second exemplary embodiment of the invention. In this example, entity 4 does not use private network 12 (FIG. 1). Rather, a single client device 120 acts like client device 14 but also performs security tasks. Client device 120 may be a small personal computer or a large multi-user computer, such as an International Business Machines AS/400 midrange computer, or a mainframe computer, or another computer.

Client device 120 includes an internal authentication and authorization ("AT+AZ") service 122. Specifically, AT+AZ service 122 strongly authenticates a person using client device 120. In addition, AT+AZ service 122 determines the whether entity 4 has authorized agent 10 to perform an action requested. Because internal AT+AZ service 122 is internal to client device 120, client device 120 may not need to authenticate agent 10 to other devices or to a private network before sending instructions 22 to entity 6.

When agent 10 logs in to client device 120, agent 10 enters one or more identity credentials. Client device 120 supplies the identity credentials to internal AT+AZ service 122. AT+AZ service 122 subsequently authenticates agent 10 or rejects the authentication request. Upon successful agent authentication, agent 10 may use internal AT+AZ service 122 together with local directory service 124 to access network resources. Specifically, internal AT+AZ service 122 keeps accurate records and grants appropriate authorizations to agents who have authenticated to AT+AZ service 122. Based on the authorizations of agent 10 granted by AT+AZ service 122, agent 10 may access hyperlink files presented by internal local directory service 124. The hyperlink files represent network resources provided by entity 6 or other entities. As described above, internal local directory service 124 verifies whether entity 4 has authorized agent 10 to interact with the requested network resource. Furthermore, local directory server 124 sends instructions 22 to entity 6 in accordance with one or more agreements between entity 4 and entity 6.

Client device 120 securely stores entity authentication certificates required by an internal local directory service 124. Local directory service 124 may use these certificates when sending instructions 22 to entity 6. Client device 120 employs security measures to ensure that an agent cannot alter or obtain private keys of these certificates to circumvent the security controls and features of authorizations assurance system 2. For example, client device 120 may prevent an agent from altering or obtaining private keys by storing the certificates in tamper-resistant hardware and/or requiring an initial authentication by an agent of entity 4 before the agent may use the certificates. Client device 120 may also employ security measures intended to ascertain if a malicious user has altered client device 120 in a way that threatens the trustworthy or secure operation of authorizations assurance system 2. For example, client device 120 may employ an antivirus scanning engine, a host-based intrusion detection system, a mechanism that ensures the presence of a hardware token in order to affirm that certain software elements of the invention have not been removed from the hardware in which they were originally installed, a mechanism that ensures that the network context in which client device 120 currently resides matches a network context that certain software elements of this invention was originally installed into, and other security measures.

In some cases, when agent 10 supplies authentication credentials to client device 120, client device 120 automatically sends one or more network resource requests to local directory server 16 without additional input from agent 10. For example, entity 4 may give agent 10 a key that activates an alarm system. When agent 10 operates the key on an alarm lock mechanism associated with client device 120, client device 120 may consider agent 10 authenticated. Client device 120 may then automatically send one or more network resource requests to local directory server 16 to activate the alarm system. Local directory server 16 may then notify another entity to respond to the alarm. In this example, the other entity may be a police department, security agency, fire department, and so on.

Entity 6 may issue a preprogrammed device that contains authorizations in a read-only format that allows a bearer of the preprogrammed device to access remote directory server 26. In this example, agent 10 may connect such the preprogrammed device to client device 120, authenticate as required by authentication service 122, and access remote directory server 26 via client device 120 as authorized by the preprogrammed device.

Figure 6:
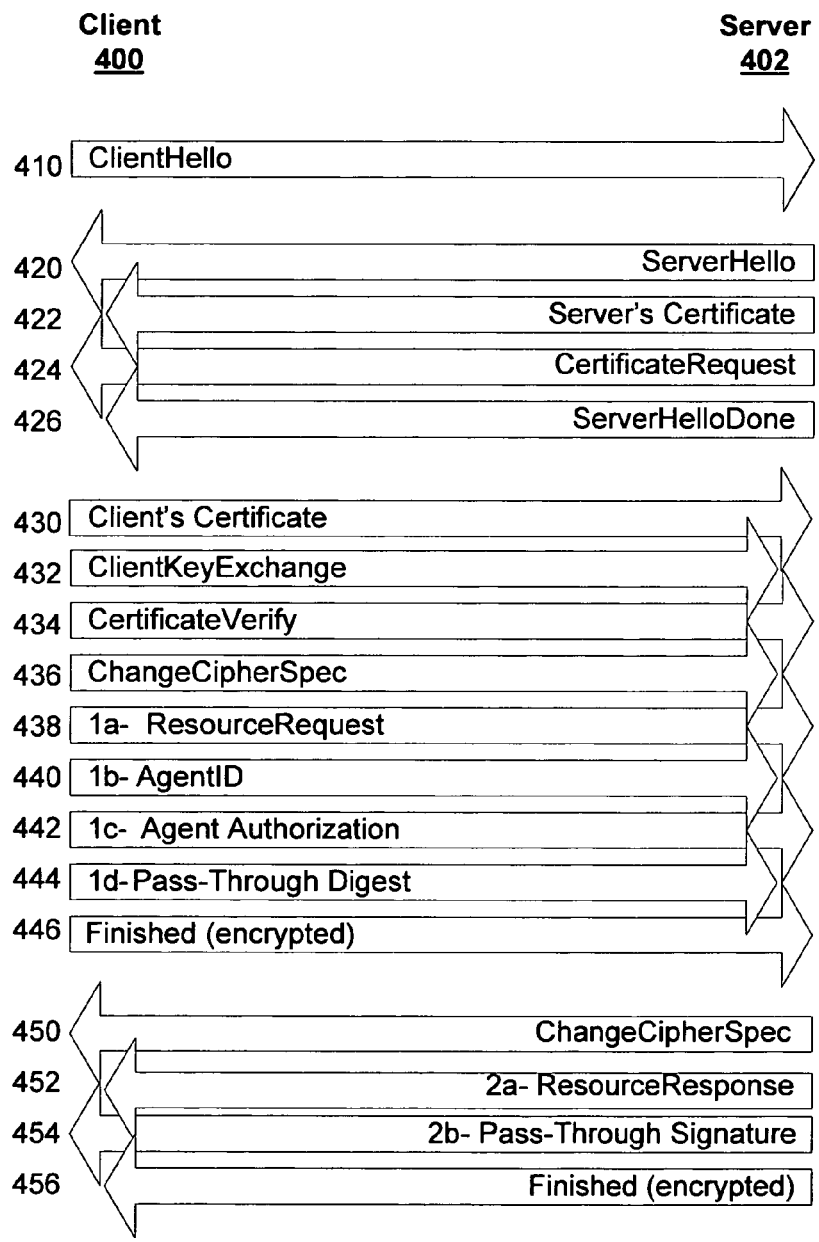
FIG. 6 is a block diagram illustrating an exemplary series of messages in a handshake portion of a TLS+ID protocol session.

FIG. 6 is a block diagram showing an exemplary series of messages illustrating a handshake sequence of an exemplary secure communication protocol. As discussed above, when client 12 requests a remote network resource, local directory server 16 securely sends agent instructions 22 to remote directory server 26. Remote directory server 26 answers instructions 22 by securely sending response 24. However, this simplistic explanation masks a complex series of communications between local directory server 16 and remote directory server 26.

Before sending and receiving an interaction request for a remote network resource, local directory server 16 and remote directory server 26 must agree on how to communicate securely. To reach this agreement, local directory server 16 and remote directory server 26 perform a "handshake" sequence. If the handshake sequence is successfully completed, local directory server 16 and remote directory server 26 have authenticated one another and local directory server 16 and remote directory server 26 have agreed on a set of communication parameters.

In a communication protocol session, one server acts as a client 400 and another server acts as a server 402. With respect to FIG. 1, local directory server 16 acts as client 400 and remote directory server 26 acts as server 402.

The exemplary secure messaging protocol of this example is referred to herein as a transport layer security plus identification ("TLS+ID") protocol. Further, the TLS+ID protocol allows client 400 to send agent identification and authorization information to server 402 as part of the handshake sequence. One skilled in the art should recognize that the TLS+ID protocol is not the only protocol that authorization assurance system 2 may use. For example, authorization assurance system 2 may use the secure sockets layer ("SSL") or transport layer security ("TLS") protocols or even, with modification, Internet Protocol security ("IPsec") protocols. These protocols perform authentication using public key cryptography or key sharing algorithms, perform key negotiation, and then communicate using the negotiated keys for the duration of a session. The description of the handshake sequence set forth herein may be adapted to extend the authentication and key negotiation phases of several encryption protocols.

A handshake sequence of a TLS+ID protocol session begins when client 400 sends a ClientHello message 410 to server 402. ClientHello message 410 alerts server 402 that client 400 desires to initiate a TLS+ID session. In particular, ClientHello message 410 contains information about how client 400 can communicate. For instance, ClientHello message 410 may include a protocol version number that informs server 402 the protocol in which client 400 intends to communicate. In addition, ClientHello message 410 suggests a symmetric key encryption algorithm, an asymmetric key encryption algorithm, a hashing algorithm, and some random data used to make a symmetric session key. Example symmetric encryption algorithms include data encryption standard ("DES"), and international data encryption algorithm ("IDEA"). Example asymmetric data encryption algorithms include Diffie-Hellman, the Rivest-Shamir-Adelman algorithm ("RSA"), or Digital Signature Algorithm ("DSA"). Example hashing algorithms include the Secure Hashing Algorithm (SHA also called SHA1), MD5, SHA-256, SHA-384, or SHA-512 using 160-bit or other valid digest lengths. ClientHello message 410 may also suggest a resume method as described below.

In response to ClientHello message 410, server 402 sends four messages back to client 400. A ServerHello message 420 confirms the communications preferences sent in ClientHello message 410 or provides alternate communication preferences. In this way, client 400 and server 402 "agree" on a protocol, a private key encryption algorithm, a public key encryption algorithm, and a hashing algorithm. Next, server 402 sends a server certificate message 422. Server certificate message 422 contains a public key certificate ("PKC") that contains a public key associated with server 402. Because a mutually trusted third party has vouched for the authenticity of the PKC, client 400 can use the PKC as proof that the public key contained in the PKC actually belongs to server 402. Server 402 also sends a certificate request message 424 to ask client 400 to send to server 402 a PKC containing a public key associated with client 400. Finally, server 402 sends a ServerHelloDone message 426 to client 400. ServerHelloDone message 426 signals to client 400 that client 400 can proceed with the next phase of the handshake.

After receiving ServerHelloDone message 426 from server 402, client 400 sends a client's certificate message 430 to server 402. Client's certificate message 430 contains a PKC certificate that identifies client 400. If server 402 deems the PKC inappropriate, server 402 indicates to client 400 in a resource response message 452 that client 400 must restart the handshake protocol using a different PKC. On the other hand, if server 402 accepts the PKC, server 402 has authenticated client 400. In the context of FIG. 1, entity 6 has authenticated entity 4. In addition, client 400 sends a client key exchange message 432 message to server 402. Client key exchange message 432 contains a symmetric session key that client 400 and server 402 use in symmetric key encryption for the duration of the session. Because client 400 and server 402 agree that the PKC of the other is valid, client 400 can use the public key of server 402 to encrypt the symmetric session key.

Client 400 then sends a "certificate verify" message 434 to server 402. "Certificate verify" message 434 informs server 402 that client 400 has accepted the PKC sent by server 402 in server's certificate message 422. Finally, client 400 sends a ChangeCipherSpec message 436. ChangeCipherSpec message 436 informs server 402 that client 400 intends to encrypt all future communications in the TLS+ID session using the symmetric session key sent in client key exchange message 432.

Resource request message 438 contains information identifying a network resource. For example, the information identifying the network resource could be a uniform resource locator ("URL"), an object identifier ("OID"), a Universally Unique Identifier (UUID), or other value that uniquely identifies the resource within entity 6 that, in combination with the PKC identification of entity 6, uniquely identifies the resource among all possible resources. Resource request message 438 may also contain a unique identifier indicating the agency-resource-agreement in place between entities 4 and 6, which supports a claim of entity 4 on entity 6 and provides the legal authority for entity 4 to make the request. If the resource request message 438 does not directly identify the agency-resource-agreement, then the information identifying the network resource together with the provider-named-privileges could be used to infer which agency-resource-agreement should be associated with this request.

Resource request message 438 also contains information intended to make this request unique when compared to all past and future transactions made using authorizations assurance system 2. Uniqueness information may include a precise time and date "timestamp," which may be generated by a server operated by entity 4 or by a mutually trusted third party. Uniqueness information may also include the certificate use counter, e.g., the integer number representing how many requests this PKC has initiated in its lifetime of use. When this information is included in the data signed by the PKC of entity 4, it can be inferred that this information was asserted within the context of the useful lifetime of the PKC operated by entity 4 whose name and other information is indelibly certified within the PKC.

In addition, resource request message 438 includes a collection of parameters that describe how server 402 should fulfill the request for the network resource. In particular, resource request message 438 may contain security parameters that define a level of security. The security parameters may pertain to encryption methods, hashing methods use to determine message integrity, agent authentication, which audit messages must be sent from one entity to the other, the duration of audit record storage, minimum quality of service, and assertions by one or both entities concerning the safe handling of the data sent and/or received after client 400 or server 402 has securely transmitted and decrypted the data; and how client 400 and server 402 store copies of the resource request security parameters in an audit log.

In addition, resource request message 438 may include encrypted self-assurance information including encrypted authorization records of agent 10, or a digest of the same, created by a server or service on private network 12 that can only be successfully decrypted by a key held in secret by entity 4. An encrypted digest or collection of authorization records of agent 10 may help entity 4 assure itself later that no error occurred in assertions of local directory server 16 of authorization of agent 10 in message 442. Additional types of self-assurance information may also be included as identity data in message 440.

When server 402 receives resource request message 438, server 402 examines the security parameters. For example, remote directory server 26, acting as server 402, may compare the security parameters to an agreement between the entity 4 and entity 6. Next, server 402 may examine the uniqueness information. For example, remote directory server 26 acting as server 402 may compare the timestamp to a local clock and determine if the timestamp is egregiously out of date or synchronization. It may also request validation of the certificate use counter value sent from a trusted third party, or verify that the counter number was within the maximum use counter indicated on the PKC and above the last counter value it had received in prior requests using this PKC. No action is required by remote directory server 26 to verify any encrypted self-assurance information except to verify that it does not exceed a maximum allowed length. Remote directory server 26 may then comply with the resource request when the comparison demonstrates that the uniqueness information and self-assurance information is acceptable and the security parameters are within an acceptable range as defined by the agreement. If server 402 cannot satisfy one or more of the security parameters described in resource request message 438, or if entity 6 does not allow one or more of the security parameters in resource request message 438, or if the uniqueness information or self-assurance information is unacceptable, server 402 returns a resource response message 452 indicating that server 402 denies the request. When client 400 receives resource response message 452 denying the request, client 400 aborts the handshake.

Two messages may follow resource request message 438: agent ID message 440 and agent authorization message 442. These messages represent authorization assurances sent by entity 4 to entity 6. If present, agent ID message 440 contains information that entity 4 certifies to be true about entity 4, agent 10, or an operating context of instructions 22. For example, agent ID message 440 may contain a telephone number, and a first and last name of agent 10. Generally, entity 6 does not use agent ID message 440 to build a record of which agent within entity 4 was responsible for sending instructions 22. Nor does entity 6 accumulate personally identifiable information such as the information protected under the Health Insurance Portability and Accountability Act (HIPAA) or the Gramm-Leach-Bliley Act (GLBA), because doing so may incur some level of liability and responsibility on entity 6. Instead, entity 6 may use agent ID message 440 to provide context information to add to the convenience of agent 10 who makes request message 438 or to add to the security of entity 4. For example, entity 4 may use one or more telephone number attributes sent in agent ID message 440 to call agent 10 or alternatively or in conjunction to call another authorized agent of entity 4 to confirm the instructions. If the instructions constitute an order for goods or services, the ability to confirm the instructions could reduce fraud. In this way, the TLS+ID protocol promotes the reduction of stores of personally identifiable information and enhances security, accountability, and non-repudiation. For this reason, entity 6 may contractually require entity 4 to send agent ID message 440.

Agent ID message 440 may also contain an authentication credential required by resource server 30 to authenticates entity 4 within the context of entity 6 and local area network 28. Entity 6 may require such an authentication credential if entity 6 keeps remote directory server 26 in a quarantined local area network referred to as a "demilitarized zone." In this case, entity 4 provides authentication credentials so that entity 4 can use network resources located outside the "demilitarized zone." For example, entity 6 may secure communications over local area network 28 using a PKC-based network encryption protocol. In this example, agent ID message 440 may contain a PKC and a private-key-encrypted credential that identifies and authenticates agent 10.

In another example of including an authentication credential in agent ID message 440, local area network 28 may be a private network that requires individual users provide identification credentials in a specific format. In this case, agent ID message 440 may contain one or more authentication credentials arranged in the specified format. If resource server 30 is an authentication server to local area network 28, remote directory server 16 may send the authentication credentials to resource server 30.

If present, agent authorization message 442 contains one or more entries in a list of authorization information. This disclosure refers to each entry in this list as a provider-named-privilege ("PNP"). For instance, a PNP might list relevant groups to which agent 10 belongs, e.g., "office managers" and "shipping department." Further, to indicate that entity 6 has defined a privilege for a resource provided by entity 6, entity 6 may name a PNP. For example, entity 6 may define a group called "office managers. Such a PNP may appear as "entity 6, office managers." Alternatively, a PNP may contain a name and group defined by a third party for a resource provided by entity 6, e.g., "third party entity, office managers."

Transaction digest message 444 contains a digitally signed version of messages 438-422 that ensures that resource request message 438, agent ID message 440, and agent authorization message 442 were not altered during transmission. Specifically, client 400 creates a digest by processing the contents of messages 438, 440, and 442 through the hash function agreed upon in ClientHello message 410 and ServerHello message 420. Client 400 then encrypts the digest using a private key of entity 4 to create assurance digest message 444.

Upon receiving transaction digest message 444, server 402 uses assurance digest message 444 to verify the integrity of resource request message 438, agent ID message 440, and agent authorization message 442. Specifically, server 402 uses the agreed hash function to generate a digest of the received content of messages 438, 440, and 442. Server 402 then uses the public key of client 400 to decrypt message 444. Decrypting assurance digest message 444 recreates a decrypted digest. If the generated digest and the decrypted digest do not match, server 402 concludes that messages 438, 440, 442, or 444 were altered during transmission. Consequently, server 402 terminates the transaction.

Verifying the integrity of messages 438, 440, and 442 ensures that a third party has not altered the messages during transmission and ensures that local directory server 16 is operating correctly. In addition, verifying the integrity of messages 438, 440, and 442 assures entity 6 that records in audit log 31 of messages 438, 440, and 442 retain evidentiary usefulness. After verification, entity 6 is confident that entity 4 actually sent the messages received by entity 6. In other words, entity 6 may offer proof of verification to rebut an argument by entity 4 that a third party altered instructions 22 and that entity 4 is therefore not liable for the consequences of the received instructions.

Client 400 uses encryption to ensure the confidentiality of the contents of messages 438, 440, 442, and 444. Specifically, client role 400 may encrypt messages 438, 440, 442, and 444 using a public key found in the certificate sent by server 402 in server's certificate message 422. Alternatively, client 400 may encrypt messages 438, 440, 442, and 444 using a symmetric session key which client 400 sent in client key exchange message 432.

Following assurance digest message 444, client 400 sends a finished message 446. Finished message 446 contains a digitally signed version of messages 410 through 444, hashed using the agreed hashing algorithm and encrypted using the symmetric session key and the agreed symmetric encryption algorithm. When server 402 receives finished message 446, server 402 decrypts finished message 446. Sever 402 then compares the decrypted finished message to a digest of all messages sent and received by server 402 thus far in the TLS+ID session. This assures server 402 that no message in the TLS+ID session has been altered during transmission.

Server 402 responds to messages 430-446 with a message block 450-456. Messages in message block 450456 indicate whether server 402 accepts messages 430-446. In addition, message block 450-456 includes a change cipher spec message 450 that indicates to client 400 that server 402 intends to encrypt all further messages in the TLS+ID session using the symmetric session key.

Entity 4 may require that entity 6 send a response confirming whether entity 6 intends to fulfill the network resource request of resource request message 438. In particular, the TLS+ID protocol allows server 402 to send a resource response message 452 and an assurance signature message 454. Resource response message 452 indicates the final decision of server 402 to accept or reject the resource request and other communications parameters specified in resource request message 438. The uniqueness information returned in resource response message 452 may include a timestamp generated by server 402 or obtained from a mutually trusted third party as of server 402's final decision to accept or reject the resource request. The uniqueness information may further contain a certificate use count value, e.g., the integer number representing how many resource response messages this PKC has signed in its lifetime of use. The self-assurance information of client 400, if received, is also returned to client 400. Entity 4 may opt to store resource response message 452 in audit log 19 as proof that entity 6 accepted or rejected the request. Specifically, entity 4 can use resource response message 452 as evidence if entity 6 argues that entity 6 never received or did not authorize the resource request.

Transaction signature message 454 assures client 400 that server 402 correctly received messages 438-442. Specifically, transaction signature message 454 contains digitally signed version of transaction messages 438-442 previously sent by client 400. Server 402 creates the digitally signed version by computing the digest value by decrypting assurance digest message 444. To verify the correctness of the digest encrypted in assurance digest message 444, server 402 computes a digest value by processing messages 438, 440, and 442 through the agreed hash function. If these digest values are equal, server 402 then signs the digest by encrypting the digest using the private key of server 402. Upon receiving transaction signature message 454, client 400 verifies that transaction signature message 454 contains a correct digest of messages 438-442. Entity 4 may use transaction signature message 454 as evidence that entity 6 correctly received resource request message 438, agent ID message 440, and agent authentication message 442. This also prevents entity 6 from altering messages after receiving them.

Like finished message 446, finished message 456 contains an encrypted and digitally signed version of all handshake messages 410-454 sent and received in this TLS+ID session by server 402. Client 400 can consider finished message 456 to be an affirmation of the agreed upon cryptographic algorithm selection and the symmetric session key. After server 402 sends finished message 456, the handshake portion of the TLS+ID protocol is complete and the application data portion of the TLS+ID protocol may begin. At this time both entities have digitally signed the same sets of messages e.g, messages 438-442 and messages 410-454, and both entities have the capacity to retain the original messages plus the two signatures in both cases. One agency-resource-agreement has been either directly identified or else implied, and the transaction has been uniquely identified in history using a combination of timestamps and counter values unique to both of the participating entities. Each of the received security parameters, identity information and authorizations have been certified by entity 4, verified and deemed acceptable by entity 6, and all actions so far have been taken pursuant to the agency-resource-agreement in place between the two entities. At this time, and not before, entity 6 agrees to trust the instructions that entity 4 (and indirectly agent 10) has promised to send, insofar as entity 6 has obligated itself to do so under an agency-resource-agreement to which entity 6 has bound itself and continues to honor.

Figure 7:
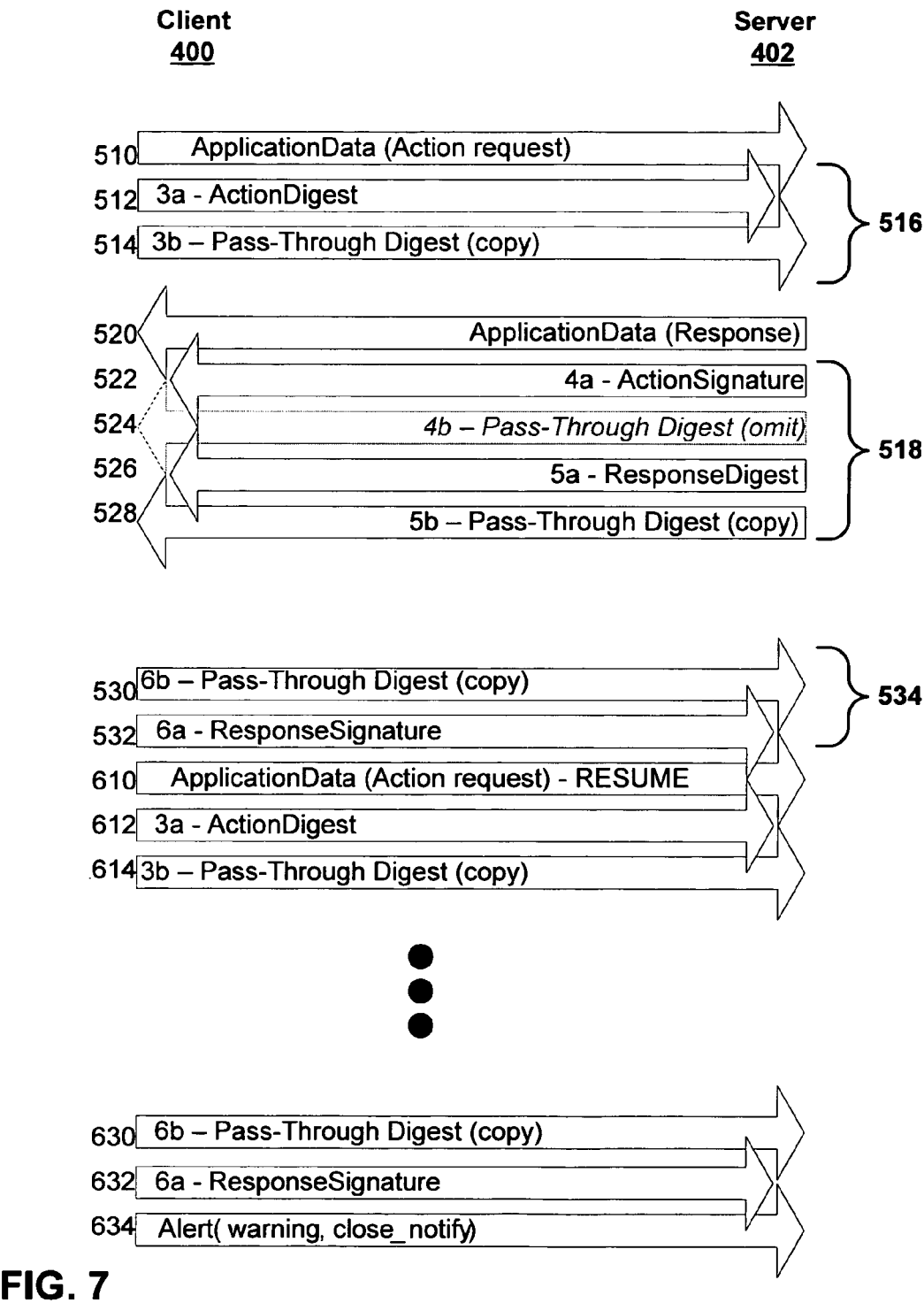
FIG. 7 is a block diagram illustrating an exemplary series of message in an application data portion of a TLS+ID protocol session.

FIG. 7 is a block diagram illustrating an exemplary sequence of messages that convey application data in the TLS+ID protocol between a client 400 and a server 402 in accordance with the principles of this invention. In the TLS+ID protocol, a pair of TLS+ID messages follows each transmission of application data.

Client 400 begins an application data portion of a TLS+ID session by sending application data message 510. In the context of authorization assurance system 2 described above, the application data may constitute additional interaction information. For example, if the requested network resource is a fax machine, the application data might be the content of a fax-compatible document.

Next, client 400 uses the hashing algorithm and bit length agreed upon in the handshake portion of the session to compute a message digest of the application data contained in application data message 510. Client 400 then concatenates the message digest with a copy of the assurance digest computed for assurance signature message 454 to form a block 516. Client 400 then digitally signs block 516. That is, client 400 encrypts block 516 with the private key of client 400. Because block 516 occurs after client 400 has sent ChangeCipherSpec message 436, client 400 encrypts both the application data 510 and block 516 using the symmetric session key. Client 400 then sends application data 510 and block 516 to server 402.

When server 402 receives application data 510 and block 516, server 402 decrypts application data 510 and block 516 using the symmetric session key. Server 402 may store block 516 in audit log 31 if required by resource request 438. Server 402 then decrypts block 516 using the public key specified by the PKC belonging to client 400. After decrypting block 516, server 402 has obtained the hashed version of application data message 510 and the assurance digest of message 444. Server 502 then computes the digest value over all application data messages sent so far in the application-data session, i.e., message 510. Server 502 then compares the computed digest value of application data message 510 with the decrypted digest sent by client 400 in action digest message 512. If these digests are not the same, server 402 sends an alert to client 400 and terminates the TLS+ID session.

Server 402 verifies that assurance digest message 514 contains the same value that server 402 sent in assurance signature message 454. Server 502 terminates the transmission if server 402 discovers an error. If server 402 does not discover an error, server 402 stores the values sent by client 400. Entity 6 may subsequently use messages 510-514 as evidence that an authenticated and authorized agent of entity 4 sent the action request of application data message 510. Specifically, entity 6 may use action digest message 512 to show that a third party did not alter application data message 510 during transmission. In addition, entity 6 may use transaction digest message 514 in its digital signature format to demonstrate that entity 4 authorized the agent identified in agent ID message 440 to send the application data message 510. Further, entity 4 cannot later claim that application data message 510 contained different content. This is because entity 4 signed the content with the private key of entity 4. That is, entity 6 does not know the private key of entity 4 and therefore cannot create action request digest message 512 and assurance digest message 514.

After server 402 successfully validates action digest message 512 and assurance digest message 514, server 402 transmits an application data response message 520 to client 400. Response message 520 acknowledges the receipt of application data message 510. Server 502 encrypts application data message 520 using the symmetric session key and the selected encryption algorithm.

In addition, server 402 creates a message block 518 composed of a computed digest 522 of the application data sent by client 402 in application data message 510; a computed digest 526 of the application data in application data response message 520; and a computed digest 528 of messages 438-444. Server 402 may omit digest message 524 when digest message 524 is redundant with digest message 528. Pursuant to the instructions found in resource request 438, server 402 may omit either of messages 522 and 528 from message block 518. If server 402 omits both message 522 and message 528 pursuant to resource request 438, server 402 does not send message block 518. Otherwise, server 402 creates a digitally signed version of messages 522-528 by encrypting a concatenation of the three message digests using a private key of server 402. Encrypting the concatenation of the digests of messages 522-528 preserves context information. For example, neither action digest message 512 nor response digest message 526 is certain to contain any reference to the time and date or many of the other fields specified in resource request message 438 or other messages in the transaction block of messages 438-444. If action digest message 512 or response digest message 526 are signed individually and are not aggregated into signed message block 518, the context of the information sent in any of the transaction message block messages 438-444, e.g., the context of the specific date and time, could not be inferred. In such a case, neither entity 4 nor entity 6 could be certain that client 400 sent either action digest 512 or response digest 526 within the context of an occasion in dispute. Server 402 then encrypts the certified digests using the symmetric session key for the current session.

Upon receipt of message block 518, client 400 verifies block 518 by decrypting and comparing the contained messages. In addition, entity 4 may store block 518 in audit log 19 as evidence that entity 6 correctly received application data message 510. Moreover, because server 402 signed block 518 using a private key of server 402, entity 6 cannot claim that entity 4 sent application data different that application data now shown.

In response, client 400 may compose a message block 534 that contains a computed digest 532 of the application data in response message 520 and a computed digest 530 of messages 438-444. Client 400 may send block 534 if required by resource request 438. If resource request 438 requires message block 534, client 400 digitally signs message block 534 using the current PKC private key of client 400. Client 400 then encrypts the message digests using the symmetric session key and sends block 534 to server 402.

If resource response message 452 allows for session resumption and client 400 has another action request to send, client 400 repeats the sequence of messages described in messages 510-532 as messages 610-632.

Finally, client 400 sends alert message 634 to conclude the TLS+ID session. Client 400 may resume a recently terminated session by sending a ClientHello message 410 to server 402 that contains a session identifier of the concluded TLS+ID session. Specifically, local directory server 16 sends a session ID number received from remote directory server 26 in a previous ServerHello message 420 message in a new ClientHello message 410. After receiving the new ClientHello message, remote directory server 26 may reply with a new ServerHello message 420. Following ServerHello message 420, client 400 may send ChangeCipherSpec message 436 and transaction block messages 438-444. Client 400 may then send a new finished message 446. From this point forward, the handshake continues as described above for the TLS+ID protocol.

Authorizations assurance system 2 may use one or more methods to improve the total data throughput of instructions 22 and responses 24 transmitted between local directory server 16 and remote directory server 26. High data throughput levels may be very important in regards to resources such as electronic voting tabulation services. In this case, many agents of entity 4 may cast voting ballots through local directory server 16. In response to the ballots, entity 6 may need to register and tabulate the ballots quickly and accurately. Other point situations in which authorization assurance system 2 may require high data throughput level may include point-of-sale credit card and check validation, energy supply and distribution systems, and so on. To increase throughput, entities 4 and 6 may equip either or both local directory server 16 and remote directory server 26 with cryptographic co-processors to offload cryptographic processing from the existing computing hardware.

In cases where agreements between entities 4 and 6 allow entities 4 and 6 to omit action digest message 512, transaction digest message 514, and action signature message 522, authorization assurance system 2 may also improve the throughput by delegating symmetric cryptographic processing and responsibility to complete transactions to client device 14. In particular, local directory server 16 may offload post-handshake transaction processing to client device 14 by securely transmitting the symmetric session key and algorithm parameters negotiated in TLS+ID handshake protocol messages 410 through 456, and also the certificate use number, server Internet Protocol address and port number, to client device 14. After receiving the symmetric session key and the algorithm parameters, client device 14 reconnects to local directory server 16. Client device 14 may then use SSL/TLS methods to encrypt instructions 22 using the symmetric session key and algorithm parameters provided by local directory server 16. Client device 14 may then transmit SSL/TLS formatted Internet Protocol packets to local directory server 16. Local directory server 16 then forwards the Internet Protocol packets as instructions 22 to remote directory server 26.

In a system where local directory server 16 delegates symmetric cryptographic processing and responsibility for completing transactions to client device 14, local directory server 16 may store application data response 520 and response block 518 rather than pass them along to client device 14. Unencrypted type and length indicators in a record header of application data response 520 may allow local directory server 16 to determine whether to store messages 520 through 528 without needing to perform symmetric decryption on application data message 520. Local directory server 16 does not check the digest value of response digest message 526 created in this fashion for accuracy while the transaction is "in flight." However, local directory server 16 may check the digest of response digest message 526 against the contents of application data response message 520 later to ensure that a certified digest of application data response message 520 matches a digest computed by entity 4. Alternatively, entity 4 may mark a hyperlink file used by client device 14 as an interactive resource. If entity 4 marks the hyperlink file as an interactive resource, local directory server 16 may then indicate in resource request message 438 that entity 4 intends to use the network resource interactively. If local directory server 16 receives a resource response message 452 from remote directory server 26 indicating that entity 6 accepts interactive use of the network resource, local directory server 16 may close a TLS+ID socket to remote directory server 26, and securely transmit the symmetric session key and session parameters mentioned above to client device 14. Because local directory server 16 no longer has any current or ongoing responsibility to the transaction, local directory server 16 may then process other requests. In such cases, client device 14 implements components of authorization assurance system 2 that process messages 510 through 532 and 634 and related functionality such as error handling logic. As a further enhancement, client device 14 may be equipped with a cryptographic co-processor.

Remote directory server 26 may further improve performance by processing simpler requests first. For example, remote directory server 26 may improve response time by processing multiple nearly simultaneous instructions 22 asynchronously. To illustrate, suppose remote directory server 26 receives a burst of three instructions nearly simultaneously. The first two instructions will take two seconds each to process and the third instruction will take one quarter second to process. In this case, remote directory server 26 may increase overall throughput by processing the third instruction first. By processing the third instruction first, remote directory server 26 completes the third instructions in slightly more than one quarter second. In contrast, if remote directory server 26 processed the third instruction third, remote directory server 26 would complete the third instructions after four and one quarter seconds, i.e., after two seconds' processing for instruction one, followed by two more seconds' processing for instruction two, plus one quarter seconds' processing for instruction three. In order to process the third instructions first, remote directory server 26 may create a new network connection for each of the three instructions as they arrive. After performing the decryption, digest, verification and audit processing for the TLS+ID protocol, remote directory server 26 may generate a response for each of the instructions. To preserve the original order of the three instructions, remote directory server 26 appends a new field to the existing TLS+ID record layout. The new field contains a value that reflects a use counter of the certificate of local directory server 16. The certificate-specific use counter uniquely identifies each of the instructions within the context of a specific certificate used by local directory server 16. In addition, the session ID and session resumption method imply the specific certificate. For these reasons, local directory server 16 and remote directory server 26 may rely on the use counter to uniquely identify a particular collection of related instructions 22 and responses 24 within a session shared among multiple instructions. Local directory server 16 and remote directory server 26 may also apply the use counter to handshake messages once remote directory server 26 receives resource request message 438 or another message.

In order to provide consistent security within local area network 28, all servers on local area network 28 consistently use one of SSL, TLS, or TLS+ID and all servers consistently offload the processing of these encryption protocols to remote directory server 26. In particular, remote directory server 26 maintains compatibility with SSL/TLS. Maintaining compatibility with SSL/TLS may help remote directory server 26 to identify and reject illegitimate requests for TLS+ID resources using SSL/TLS correctly and to forward decrypted requests to an appropriate resource server 30 correctly. Each of the SSL, TLS and TLS+ID protocols require that client 400 send a unique version identifier in its record data structures. To avoid protocol downgrade attacks, the TLS+ID protocol requires that server 402 discover the version identifiers and encode subsequent messages according to the version indicated in the version identifiers.

Entities 4 and 6 may use authorization assurance system 2 for one or more security functions. In other words, entities 4 and 6 may use authorization assurance system 2 to interact with certificate authorities, authenticate agents, perform third party validation, alert third parties to security problems, and so on. One such security use example occurs when an entity and a certificate authority enter into an agreement wherein the entity may obtain a PKC from the certificate authority automatically. In this situation, the certificate authority may obtain audit records that demonstrate the correct functioning of authorization assurance system 2. For example, if such an agreement exists, entity 4 may configure local directory server 16 to obtain and install PKCs with a minimum of manual intervention. In addition, entity 4 may configure local directory server 16 to remit audit records of the functioning of authorization assurance system 2.

In a second security use example, entity 4 may provide access to resources, facilities or amenities to a visiting agent of entity 6 (not shown) by using authorization assurance system 2. This may occur when the agent of entity 6 visits a business location, site, grounds or campus owned or otherwise under the control of entity 4. The agent of entity 6 (not shown) may attempt to access client device 14, which may be used by entity 4 to secure any of the resources, facilities or amenities at a site of entity 4 against unauthorized use. For example, client device 14 may be a smart card reader and agent of entity 6 may hold a smart card issued by entity 6. Authorization assurance system 2 may be used by entity 4 to securely authenticate the smart card held by visiting agent of entity 6 by securely delegating the task of authenticating the smart card to a resource server 30 at entity 6. The visiting agent of entity 6 may supply identification and credentials to client device 14, which, in turn, presents these as an authentication request to authentication server 20 at entity 4. Authentication server 20 then analyzes the authentication request of agent of entity 6 and determines that authentication server 20 is not an authority to determine the authenticity of the supplied identity and credentials. Authentication server 20 may then determine whether local directory server 16 offers a hyperlink file that can perform authentication for agents of entity 6. After determining whether such a hyperlink file exists, authentication server 20 may send one or more requests to the identified hyperlink file on local directory server 16. These requests include the credentials supplied by agent of entity 6 to client device 14 and may include a resource identifier of client device 14. Local directory server 16 may then create and send instructions 22 that contain the credentials and optional resource identifier of client device 14. In response, remote directory server 26 indicates whether entity 6 authenticates the credentials. The response 24 may also contain the authorization records associated with this agent of entity 6 and that are associated with a resource identifier of client device 14. Based on the response, visiting agent of entity 6 is either granted access or denied access to the facility, etc., requested via client device 14 and located at the site of entity 4.

In a third security use example, entities 4 and 6 may configure directory servers 16 and 26 to obtain information from a third party that validates instructions 22 or response 24. For example, a third party may validate assertions about entities 4 or 6 contained within a PKC used for a transaction. The third party may be a governing body that reports whether the entity remains in good standing, a credit rating agency that reports a credit score of the entity, an insurance agency that reports whether an insurance policy associated with the entity remains in force, and so on. In addition, a third party may validate assertions made in agent ID message 440. For example, a third party may validate assertions in agent ID message 440 that an agent remains in good standing with a professional accrediting organization, licensing organization, union, and the like. Further, a trusted third party may validate dates and times claimed in resource request message 438 or the trusted third party may provide the correct current date and time as mentioned above. In another example, entities 4 and 6 may consult additional certificate authorities to verify PKCs used in a transaction more extensively. In particular, entities 4 and 6 may obtain assurance or proof that multiple certificate authorities currently honor a PKC by contacting all certificate authorities that have signed the PKC.

In a fourth security example, local directory server 16 or remote directory server 26 may use an automated method to inform a trusted third party when entities 4 and 6 suspect that a PKC may have been compromised or may be subject to certain risks. Such risks may include a computer virus outbreak, malicious activity affecting installed critical software, system unavailability due to fire, power outage, and so on. For example, pursuant to an agency agreement, entity 4 may configure a hyperlink file in local directory server 16 that issues security alerts automatically whenever intrusion detection software on local directory server 16 indicates a possible security compromise. Such security alerts may include unique identifiers of all PKCs stored on local directory server 16, current use counters for each of the PKCs, the nature of the alerts, indications that prompted the alerts, and so on.

Authorization assurance system 2 may contain a mechanism that addresses security flaws in software or hardware that implements the system. In particular, malicious users could potentially exploit security flaws in the software or hardware that implement authorization assurance system 2 to use encryption keys stored within local directory server 16 or remote directory server 26 without authorization. Entities that use authorization assurance system 2 may employ one or more methods that minimize the risk of unauthorized use of encryption keys. For example, a certificate authority may issue certificates with certificate extensions that limit use of the certificate outside of the context of an entity to which the certificate authority has issued the certificate.

In another example, authorization assurance system 2 may use certificates associated with servers other than local directory server 16 or remote directory server 26 when sending instructions 22 and responses 24. Agency-resource-agreements may require the sending of "self-assurances" that provide proofs of the context in which an entity used the certificate. In particular, agreements may require that an entity used the certificate while the certificate was in the possession of the entity named in the certificate. An agreement may require such assurances by stipulating that agent ID message 440 include proofs about the entity context of the agent. For example, local directory server 16 may possess one or more server certificates. Local directory server 16 may store a server certificate as a file on special tamper-resistant media installed inside local directory server 16. Upon receiving a request from client device 14 for a hyperlink file associated with an agreement that requires entity 4 to send assurances about the entity context of an agent, local directory server 16 may obtain a value such as the current date and time encrypted using a private key of the server certificate. Local directory server 16 may include the encrypted value within agent ID message 440 and the server certificate or its unique identifier as another value within agent ID message 440.

When remote directory server 26 receives an agent ID message 440 with an encrypted value and a server certificate, remote directory server 26 verifies that local directory server 16 currently has access to the server certificate. If a certificate authority issued the server certificate to a server other than local directory server 16, then remote directory server 26 has confidence that local directory server 16 has access to private network 12 and has access to a second server on private network 12. Further, remote directory server 26 may also verify that the certificate sent or indicated in agent ID message 440 or implied by the agreement governing this hyperlink file is indeed a certificate issued to entity 4. Entities 4 and 6 may exchange such assurances as often as required either by certificate extension values or by a relevant agency agreement. In this way, entities 4 and 6 assure each other that a malicious user has not comprised certificates stored in local directory server 16 or remote directory server 26.

Various embodiments of the invention have been described. For example, a system has been described in which two entities communicate data and assurances in the TLS+ID protocol using local and remote directory servers. Nevertheless, various modifications may be made without departing form the spirit and scope of the invention. For example, entities may use multiple network devices to communicate with each other. Moreover, alternate embodiments may disperse the functionality of the devices in authorization assurance system 2 among several devices or collect the functionality in devices according to alternate arrangements. In addition, various other communications protocols, such as Internet Protocol Security, may be used to communicate the assurances, application data, and resource requests. Further, other authorization assurances may be made. These and other embodiments are within the scope of the following claims.

The invention claimed is:

1. A method comprising:
maintaining a computer-readable record of an agreement that has been entered into between a first entity and a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;
receiving, by the second entity via a computer network, a digitally signed version of a request sent by the first entity to interact with the network resource that is provided by the second entity, wherein the request distinctly identifies the network resource and the second entity as a resource provider, and wherein the request distinctly identifies the first entity as a requestor;
receiving, by the second entity via the computer network, assurances sent by the first entity, the assurances comprising authorization information that is distinct from the request identifying the network resource, wherein the request or the authorization information identifies the agreement, wherein the agreement is accepted by the first person prior to the first entity sending the digitally signed version of the request and the assurances, wherein the agreement confers the rights and obligations that pertain to the network resource and that are exchanged between the first person including its agent and the second person, and wherein the agent is legally authorized to perform one or more actions that legally bind the first person;
receiving, by the second entity via the computer network, authentication information from the first entity, wherein the authentication information is distinct from both the request and the authorization information;
examining, by the second entity, the authentication information to determine whether the authentication information, the assurances, and the request originated from the first entity;
comparing, by the second entity, the network resource and the assurances to a standard of acceptability that is defined in the agreement between the first person associated with the first entity and the second person associated with the second entity and that relates to the rights and obligations conferred to the first person by the second person via the agreement, wherein the comparing comprises accessing the record of the agreement maintained by the second entity;
complying with the request to interact with the network resource, by the second entity, subject to acceptance of the assurances based upon the comparison, such acceptance indicating that the network resource is described in the agreement and that the agent is authorized to act on behalf of the first person associated with the first entity with respect to the request;
sending a first digitally signed version of a response from the second entity to the first entity indicating compliance with the request to interact with the network resource subject to acceptance of the assurances based upon the comparison, wherein the response further includes reference to the assurances and the standard of acceptability; and
receiving, by the second entity, a second digitally signed version of the response from the first entity, wherein the second digitally signed version of the response indicates that the first entity has verified the response.

2. The method of claim 1, wherein the agreement between the first person associated with the first entity and the second person associated with the second entity is uniquely identified with respect to the second entity, and wherein the agreement comprises a computer-readable identifier for the network resource and further comprises a computer-readable version of the standard of acceptability for the assurances for the network resource provided by the second entity to the first entity.

3. The method of claim 1, wherein receiving the digitally signed version of the request comprises verifying that the request has not changed during transmission from the first entity via the computer network.

4. The method of claim 1, wherein receiving authentication information authenticating the first entity comprises:

receiving a certificate from the first entity vouched for by a mutually trusted third party; and complying with the request subject to validity of the certificate.

5. The method of claim 1, wherein receiving assurances comprises:
receiving the authorization information from the first entity via the network; and
storing a copy of the authorization information in an audit log.

6. The method of claim 5, further comprising:
receiving a digitally signed version of the authorization information;
verifying that the authorization information has not changed during transmission using authentication information for the first entity; and
complying with the request subject to the verification.

7. The method of claim 1, wherein receiving assurances comprises:
receiving agent identity information about the agent; and
storing a copy of the agent identity information in an audit log.

8. The method of claim 7, further comprising complying with the request subject to the agent identity information.

9. The method of claim 7, further comprising:
receiving a digitally signed version of the agent identity information;
using the digitally signed version to verify that the agent identity information has not changed during transmission; and
complying with the request subject to the verification.

10. The method of claim 1, wherein receiving the digitally signed version of the request comprises receiving security parameters from the first entity via the network, wherein the security parameters define a level of security.

11. The method of claim 10, further comprising:
comparing the security parameters to the agreement between the first entity and the entity; and
complying with the request when the comparison demonstrates that the security parameters are within an acceptable range as defined in the agreement.

12. The method of claim 1, wherein complying with the request includes delegating the request to another computer or system of computers.

13. The method of claim 1, wherein:
receiving the digitally signed version of the request from the agent comprises receiving a purchase order; and
complying with the request comprises executing the purchase order when the second entity accepts the assurances that the agent is authorized to make the purchase order for the first entity.

14. The method of claim 1, wherein:
receiving the digitally signed version of the request from the agent comprises receiving a request for a document; and
complying with the request comprises delivering the document to the agent when the second entity accepts the assurances that the agent is authorized to view the document.

15. The method of claim 1, wherein:
receiving the digitally signed version of the request from the agent comprises receiving a fax; and
complying with the request comprises receiving the fax when the second entity accepts the assurances that the first entity has authorized the agent to send the fax.

16. The method of claim 1, wherein:
receiving the digitally signed version of the request from the agent comprises receiving electronic funds transmission instructions; and
complying with the request comprises accepting the transfer of funds as specified and accepting responsibility for the timely execution of the transfer.

17. The method of claim 1, wherein:
receiving the digitally signed version of the request comprises receiving a voting ballot cast by the agent; and
complying with the request comprises registering and tabulating the ballot.

18. The method of claim 1, further comprises further comprising storing a copy of the digitally signed version of the request in an audit log.

19. The method of claim 18, further comprising:
using the digitally signed version of the request to verify that the request has not changed during transmission across the network; and
complying with the request subject to the verification.

20. The method of claim 1, wherein the first and second entities communicate using a secure communication protocol.

21. A non-transitory computer readable medium comprising computer readable instructions that cause a processor to:
maintain a computer-readable record of an agreement that has been entered into between a first entity and a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;
receive, by the second entity via a computer network, a digitally signed version of one or more agent instructions sent by the first entity to interact with the network resource that is provided by the second entity, wherein the one or more agent instructions distinctly identify the network resource and the second entity as a resource provider, and wherein the agent instructions distinctly identify the first entity as a requestor;
receive, by the second entity via the computer network, assurances sent by the first entity, the assurances comprising authorization information that is distinct from the agent instructions identifying the network resource, wherein the agent instructions or the authorization information identifies the agreement, wherein the agreement is accepted by the first person prior to the first entity sending the digitally signed version of the agent instructions and the assurances, wherein the agreement confers the rights and obligations that pertain to the network resource and that are exchanged between the first person including its agent and the second person, and wherein the agent is legally authorized to perform one or more actions that legally bind the first person;
receive, by the second entity via the computer network, authentication information from the first entity, wherein the authentication information is distinct from the agent instructions and the authorization information;

examine, by the second entity, the authentication information to determine whether the authentication information, the assurances, and the agent instructions originated from the first entity;

compare, by the second entity, the network resource and the assurances to a standard of acceptability that is defined in the agreement between the first person associated with the first entity and the second person associated with the second entity and that relates to the rights and obligations conferred to the first person by the second person via the agreement, wherein the comparing comprises accessing the record of the agreement maintained by the second entity;

comply with the agent instructions to interact with the network resource, by the second entity, subject to acceptance of the assurances based upon the comparison, such acceptance indicating that the network resource is described in the agreement and that the agent is authorized to act on behalf of the first person associated with the first entity with respect to the agent instructions;

send a first digitally signed version of a response from the second entity to the first entity indicating compliance with the agent instructions to interact with the network resource subject to acceptance of the assurances based upon the comparison, wherein the response further includes reference to the assurances and the standard of acceptability; and receive, by the second entity, a second digitally signed version of the response from the first entity, wherein the second digitally signed version of the response indicates that the first entity has verified the response.

22. The non-transitory computer readable medium of claim 21, wherein the computer readable instructions cause the processor to:

store a copy of the digitally signed version of the one or more agent instructions in an audit log.

23. The non-transitory computer readable medium of claim 21, further comprising computer readable instructions that cause the processor to verify that the one or more agent instructions and assurances were not changed during transmission.

24. The non-transitory computer readable medium of claim 21, wherein the one or more agent instructions comprise a purchase order and the computer readable instructions cause the processor to comply with the one or more agent instructions by executing the purchase order when the second entity accepts the assurances that the agent is authorized to make the purchase order for the first entity.

25. A method comprising:

providing, by a first entity, an acceptance to enter into an agreement with a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;

sending, from the first entity to the second entity via a computer network, a digitally signed version of a request to interact with the network resource that is provided by the second entity, wherein the request distinctly identifies the network resource and the second entity as a resource provider, and wherein the request distinctly identifies the first entity as a requestor;

sending, from the first entity to the second entity via the computer network, assurances comprising authorization information that is distinct from the request identifying the network resource, wherein the request or the authorization information identifies the agreement, wherein the agreement is accepted by the first person prior to the first entity sending the digitally signed version of the request and the assurances, wherein the agreement confers the rights and obligations that pertain to the network resource and that are exchanged between the first person including its agent and the second person to allow the first entity to send the digitally signed version of the request to the second entity, wherein the agent is legally authorized to perform one or more actions that legally bind the first person, and wherein the second entity maintains a record of the agreement in a computer-readable format;

sending, from the first entity to the second entity via the computer network, authentication information to allow the second entity to determine whether the authentication information, the assurances, and the request originated from the first entity, wherein the authentication information is distinct from both the request and the authorization information;

receiving, by the first entity, a first digitally signed version of a response complying with the request to interact with the network resource, from the second entity, subject to acceptance of the assurances by the second entity, such acceptance indicating that the second entity has accessed its maintained record of the agreement and has determined that the assurances and the network resource meet a standard of acceptability that is defined in the agreement between the first person associated with the first entity and the second person associated with the second entity and that relates to the rights and obligations conferred to the first person by the second person via the agreement, and such acceptance further indicating that the network resource is described in the agreements;

using, by the first entity, the first digitally signed version of the response to verify that the response has not changed during transmission across the computer network and to further verify that the response references the request, the assurances, and the agreement;

creating, by the first entity, a second digitally signed version of the response indicating that the first entity has verified the response of the second entity; and sending the second digitally signed version of the response created by the first entity to the second entity to acknowledge the verification of the response of the second entity.

26. The method of claim 25, further comprising displaying the network resource to the agent as a hyperlink file.

27. The method of claim 25, further comprising:

receiving a response indicating whether the second entity has authenticated the first entity based on the authentication information; and storing a copy of the response in an audit log.

28. The method of claim 27, wherein sending the authentication information comprises sending a certificate to the second entity vouched for by a mutually trusted third party.

29. The method of claim 25, wherein the agreement between the first person associated with the first entity and the second person associated with the second entity is uniquely identified with respect to the second entity, and wherein the agreement comprises a computer-readable identifier for the network resource and further comprises a computer-readable version of the standard of acceptability for the assurances for the network resource provided by the second entity to the first entity.

30. The method of claim 29, further comprising:
creating a digitally signed version of the authorization information; and
sending the digitally signed version to the second entity.

31. The method of claim 25, wherein sending assurances comprises:
sending agent identity information about the agent;
receiving a response from the second entity indicating whether the second entity correctly received the agent identity information; and
storing a copy of the agent identity information response in an audit log.

32. The method of claim 31, further comprising:
creating a digitally signed version of the agent identity information; and
sending the digitally signed version to the second entity.

33. The method of claim 25, further comprising:
storing a copy of the first digitally signed version of the response in an audit log.

34. The method of claim 25, wherein:
sending the digitally signed version of the request comprises sending a purchase order from the agent; and
receiving the first digitally signed version of the response comprises receiving confirmation of the purchase order when the second entity accepts the assurances.

35. The method of claim 25, wherein:
sending the digitally signed version of the request comprises sending a request for a document from the agent; and
receiving the first digitally signed version of the response comprises receiving the document when the second entity accepts the assurances.

36. The method of claim 25, wherein:
sending the digitally signed version of the request comprises sending a fax from the agent; and
receiving the first digitally signed version of the response comprises receiving confirmation of the delivery of the fax when the second entity accepts the assurances.

37. The method of claim 25, further comprising disallowing the agent from sending the first digitally signed version of the request unless the agent has been strongly authenticated by the first entity.

38. The method of claim 25, wherein the first and second entities communicate using a secure communication protocol.

39. A non-transitory computer readable medium comprising computer readable instructions that cause a processor to:
provide an acceptance to enter into an agreement with a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;
send, from an agent of the first entity to the second entity via a computer network, a digitally signed version of one or more agent instructions to interact with the network resource that is provided by the second entity, wherein the one or more agent instructions distinctly identify the network resource and the second entity as a resource provider, and wherein the agent instructions distinctly identifies the first entity as a requestor;
send, from the first entity to the second entity via the computer network, assurances comprising authorization information that is distinct from the agent instructions identifying the network resource and that allows the agent of the first entity to send the agent instructions on behalf of the first entity, wherein the authorization information or the agent instructions identify the agreement, wherein the agreement is accepted by the first person prior to the first entity sending the digitally signed version of the agent instructions and the assurances, wherein the agreement confers the rights and obligations that pertain to the network resource and that are exchanged between the first person including its agent and the second person, wherein the agent is legally authorized to perform one or more actions that legally bind the first entity, and wherein the second maintains a record of the agreement in a computer-readable format;
send, from the first entity to the second entity via the computer network, authentication information to allow the second entity to determine whether the authentication information, the assurances, and the agent instructions originated from the first entity, wherein the authentication information is distinct from both the agent instructions and the authorization information;
receive, by the first entity, a first digitally signed version of a response complying with the request to interact with the network resource, by the second entity, subject to acceptance of the assurances by the second entity, such acceptance indicating that the second entity has accessed its maintained record of the agreement and has determined that the assurances and the network resource meet a standard of acceptability that is defined in the agreement between the first person associated with the first entity and the second person associated with the second entity and that relates to the rights and obligations conferred to the first person by the second person via the agreement, and such acceptance further indicating that the network resource is described in the agreement;
use, by the first entity, the first digitally signed version of the response to verify that the response has not changed during transmission across the computer network and to further verify that the response references the agent instructions, the assurances, and the agreement;
create, by the first entity, a second digitally signed version of the response indicating that the first entity has verified the response of the second entity; and
send the second digitally signed version of the response created by the first entity to the second entity to acknowledge the verification of the response of the second entity.

40. The non-transitory computer readable medium of claim 39, wherein the computer readable instructions cause the processor to:
store a copy of the digitally signed version of the response in an audit log.

41. The non-transitory computer readable medium of claim 39, further comprising computer readable instructions that cause the processor to verify that the one or more agent instructions and assurances were not changed during transmission.

42. The non-transitory computer readable medium of claim 39, wherein:
 causing the processor to send the one or more agent instructions from the agent comprises sending a purchase order; and
 causing the processor to receive the response comprises receiving confirmation of the purchase order when the second entity accepts the assurances that the agent is authorized to make the purchase order for the first entity.

43. A system comprising:
 a local directory server of a first entity that sends a digitally signed version of a request to a second entity via a computer network to interact with a network resource provided by the second entity, the first entity and the second entity each comprising a device that is associated with legally recognized person having a name,
  wherein a first person associated with the first entity and a second person associated with the second entity have entered into an agreement, the agreement identifying both a first name of the first entity and a second name of the second entity, the agreement comprising a legal record describing rights and obligations pertaining to the network resource using language that provides an evidentiary record of actual intent of the first person and the second person, and the agreement having been digitally signed by both the first entity and the second entity to legally bind the first person and the second person to all terms of the agreement;
  wherein the request distinctly identifies the network resource and the second entity as a resource provider,
  wherein the request distinctly identifies the first entity as a requestor,
  wherein the local directory server sends assurances to the second entity via the computer network, the assurances comprising authorization information that is distinct from the request identifying the network resource,
  wherein the request or the authorization information identifies the agreement,
  wherein the agreement is accepted by the first person prior to the first entity sending the digitally signed version of the request and the assurances,
  wherein the agreement confers the rights and obligations that pertain to the network resource and that are exchanged between the first person including its agent and the second person to allow the first entity to send the digitally signed version of the request, the local directory server further sending to the second entity authentication information that is distinct from both the request and the authorization information, wherein the agent is legally authorized to perform one or more actions that legally bind the first person, and
  wherein the local directory server is further configured to receive from the second entity a first digitally signed version of a response complying with the request to interact with the network resource subject to acceptance of the assurances by the second entity, to use the first digitally signed version of the response to verify that the response has not changed during transmission across the computer network and that the response references the request, the assurances, and the agreement, to create a second digitally signed version of the response indicating that the first entity has verified the response of the second entity, and to send the second digitally signed version of the response to the second entity to acknowledge the verification of the response of the second entity; and
 a remote directory server of the second entity that receives the digitally signed version of the request and the assurances, examines the authentication information to determine whether the authentication information, the assurances, and the request originated from the first entity, accesses a record of the agreement maintained by the second entity, and compares the network resource and the assurances to a standard of acceptability that is defined in the agreement between the first person and the second person and that relates to the rights and obligations conferred to the first person by the second person via the agreement,
  wherein the remote directory server complies with the request to interact with the network resource subject to acceptance of the assurances based upon the comparison, such acceptance indicating that the network resource is identified in the agreement and that the agent is authorized to act on behalf of the first person with respect to the request, and
  wherein the remote directory server is further configured to send the first digitally signed version of the response to the first entity indicating compliance with the request to interact with the network resource subject to acceptance of the assurances, and to receive the second digitally signed version of the response from the first entity, the second digitally signed version of the response indicating that the first entity has verified the response.

44. The system of claim 43, further comprising an audit log to store the response.

45. The system of claim 43, wherein the local directory server is further configured to:
 store a copy of the digitally signed version of the response in an audit log.

46. The system of claim 43, wherein the remote directory server is further configured to:
 store a copy of the digitally signed version of the request in an audit log.

47. A method comprising:
 maintaining a computer-readable record of an agreement that has been entered into between a first entity and a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;
 receiving, by the second entity via a computer network, a request sent by the first entity to interact with the network resource that is provided by the second entity, wherein the request distinctly identifies the network resource and the second entity as a resource provider, and wherein the request distinctly identifies the first entity as a requestor;

receiving, by the second entity via the computer network, assurances sent by the first entity, the assurances comprising authorization information that is distinct from the request identifying the network resource, wherein the request or the authorization information identifies the agreement, wherein the agreement is accepted by the first person prior to the first entity sending the request and the assurances, wherein the agreement confers the rights and obligations that pertain to the network resource and that are exchanged between the first person including its agent and the second person, and wherein the agent is legally authorized to perform one or more actions that legally bind the person entity;

receiving, by the second entity, a digital signature of the request and assurances to authenticate the first entity;

storing the digital signature of the request and assurances in an audit log;

comparing, by the second entity, the network resource and the assurances to a standard of acceptability that is defined in the agreement between the first person associated with the first entity and the second person associated with the second entity and that relates to the rights and obligations conferred to the first person by the second person via the agreement, wherein the comparing comprises accessing the record of the agreement maintained by the second entity;

complying with the request to interact with the network resource, by the second entity, subject to acceptance of the assurances based upon the comparison, such acceptance indicating that the network resource is described in the agreement and that the agent is authorized to act on behalf of the first person associated with the first entity with respect to the request;

sending, from the second entity to the first entity via the computer network, a response indicating compliance with the request to interact with the network resource, the response including reference to the request and assurances sent by the first entity and to the agreement between the first person and the second person;

creating a digital signature of the response, request, and assurances, wherein the digital signature of the response is signed by the second entity;

sending, from the second entity to the first entity via the computer network, the digital signature of the response; and receiving, by the second entity, a digitally signed version of the response from the first entity, wherein the digitally signed version of the response indicates that the first entity has verified the response.

48. The method of claim 47, further comprising:
using the digital signature of the request and assurances to verify that neither the request nor the assurances have changed during transmission across the network; and
complying with the request subject to the verification.

49. The method of claim 47, further comprising receiving agent identity information regarding the agent, and wherein receiving the digital signature of the request and assurances comprises receiving the digital signature of the request, assurances, and agent identity information.

50. A method comprising:
providing, by a first entity, an acceptance to enter into an agreement with a second entity, wherein the first entity and the second entity each comprises a device associated with a legally recognized person having a name, wherein the agreement identifies both a first name of a first person associated with the first entity and a second name of a second person associated with the second entity, wherein the agreement comprises a legal record describing rights and obligations pertaining to a network resource using language that provides an evidentiary record of actual intent of the first person associated with the first entity and the second person associated with the second entity, and wherein the agreement has been digitally signed by both the first entity and the second entity to legally bind the first person and the second person to all terms of the agreement;

sending, from the first entity to the second entity via a computer network, a request to interact with the network resource that is provided by the second entity, wherein the request distinctly identifies the network resource and the second entity as a resource provider, and wherein the request distinctly identifies the first entity as a requestor;

sending, from the first entity to the second entity via the computer network, assurances comprising authorization information that is distinct from the request identifying the network resource, wherein the request or the authorization information identifies the agreement, wherein the agreement is accepted by the first person prior to the first entity sending the request and the assurances, wherein the agreement confers the rights and obligations that pertain to the network resource and that are exchanged between the first person including its agent and the second person to allow the first entity to send the request to the second entity, wherein the agent is legally authorized to perform one or more actions that legally bind the first person, and wherein the second entity maintains a record of the agreement in a computer-readable format;

creating a digital signature of the request and assurances that is signed by the first entity;

sending, from the first entity to the second entity via the computer network, the digital signature of the request and assurances;

receiving a response complying with the request to interact with the network resource, from the second entity, subject to acceptance of the assurances by the second entity, such acceptance indicating that the second entity has accessed its maintained record of the agreement and has determined that the assurances and the network resource meet a standard of acceptability that is defined in the agreement between the first person associated with the first entity and the second person associated with the second entity and that relates to the rights and obligations conferred to the first person by the second person via the agreement, and such acceptance further indicating that the network resource is described in the agreement;

receiving a digital signature of the response to authenticate the second entity, to verify that the response has not changed during transmission across the computer network, and to further verify that the response references the request, the assurances, and the agreement;

storing the digital signature of the response in an audit log;

creating, by the first entity, a digitally signed version of the response indicating that the first entity has verified the response of the second entity; and sending the digitally signed version of the response created by the first entity to the second entity to acknowledge the verification of the response of the second entity.

51. The method of claim 50, further comprising sending agent identity information regarding the agent to the second entity via the network, and wherein sending the digital signature of the request and assurances comprises sending the digital signature of the request, assurances, and agent identity information.

52. A method comprising:

storing, by a second entity, an offer to enter into an agreement between a first person associated with a first entity and a second person associated with a second entity, wherein the first entity and the second entity each comprises a device associated with a legally recognized person having a name, wherein the offer comprises a record describing rights and obligations pertaining to one or more network resources using language that provides an evidentiary record of actual intent of the first person and the second person, wherein the agreement identifies both a first name of the first person and a second name of the second person, wherein the agreement identifies the one or more network resources that are provided by the second entity, wherein the agreement defines one or more standards of acceptability for one or more subsequent requests that are sent by the first entity to interact with the one or more network resources that are provided by the second entity, and wherein the agreement further confers the rights and obligations that pertain to the one or more network resources and that are exchanged between the first person including its agent and the second person, the agent being legally authorized to perform one or more actions that legally bind the first person;

receiving, by the second entity and from the first entity via a computer network, an accepted offer to enter into the agreement;

receiving, by the second entity via the computer network, a first digital signature of the accepted offer signed by the first entity;

using the first digital signature to authenticate the first entity;

upon authentication, comparing the first digital signature to a computed value for the offer stored by the second entity in order to verify content integrity of the accepted offer;

upon verification, creating a second digital signature of the offer signed by the second entity to indicate acknowledgment of the accepted offer;

sending, from the second entity to the first entity via the computer network, the second digital signature;

storing, at the second entity, a record of the agreement in a computer-readable format, the first digital signature, the second digital signature, an identifier for each of the one or more network resources, and the one or more standards of acceptability for the one or more network resources, wherein the first person and the second person are each legally bound to all terms of the agreement;

receiving, by the second entity via the computer network, a digitally signed version of a request sent by the first entity to interact with the one or more network resources provided by the second entity, wherein the request distinctly identifies the one or more network resources and the second entity as a resource provider, and wherein the request distinctly identifies the first entity as a requestor;

receiving, by the second entity via the computer network, assurances sent by the first entity, the assurances comprising authorization information that is distinct from the request identifying the one or more network resources, wherein the request or the authorization information identifies the agreement;

sending a first digitally signed version of a response from the second entity to the first entity indicating compliance with the request to interact with the network resource subject to acceptance of the assurances, wherein the response further includes reference to the assurances and the one or more standards of acceptability; and receiving, by the second entity, a second digitally signed version of the response from the first entity, wherein the second digitally signed version of the response indicates that the first entity has verified the response.

53. A non-transitory computer readable medium comprising computer readable instructions that cause a processor to:

store, by a second entity, an offer to enter into an agreement between a first person associated with a first entity and a second person associated with a second entity, wherein the first entity and the second entity each comprises a device associated with a legally recognized person having a name, wherein the offer comprises a record describing rights and obligations pertaining to one or more network resources using language that provides an evidentiary record of actual intent of the first person and the second person, wherein the agreement identifies both a first name of the first person and second name of the second person, wherein the agreement identifies the one or more network resources that are provided by the second entity, wherein the agreement defines one or more standards of acceptability for one or more subsequent requests that are sent by the first entity to interact with the one or more network resources that are provided by the second entity, and wherein the agreement further confers the rights and obligations that pertain to the one or more network resources and that are exchanged between the first person including its agent and the second person, the agent being legally authorized to perform one or more actions that legally bind the first person;

receive, by the second entity and from the first entity via a computer network, an accepted offer to enter into the agreement;

receive, by the second entity via the computer network, a first digital signature of the accepted offer signed by the first entity;

use the first digital signature to authenticate the first entity;

upon authentication, compare the first digital signature to a computed value for the offer stored by the second entity in order to verify content integrity of the accepted offer;

upon verification, create a second digital signature of the offer signed by the second entity to indicate acknowledgment of the accepted offer;

send, from the second entity to the first entity via the computer network, the second digital signature;

store, at the second entity, a record of the agreement in a computer-readable format, the first digital signature, the second digital signature, an identifier for each of the one or more network resources, and the one or more standards of acceptability for the one or more network resources, wherein the first person and the second person are each legally bound to all terms of the agreement;

receive, by the second entity via the computer network, a digitally signed version of a request sent by the first entity to interact with the one or more network resources provided by the second entity, wherein the request distinctly identifies the one or more network resources and the second entity as a resource provider, and wherein the request distinctly identifies the first entity as a requestor;

receive, by the second entity via the computer network, assurances sent by the first entity, the assurances comprising authorization information that is distinct from the request identifying the one or more network resources, wherein the request or the authorization information identifies the agreement;

send a first digitally signed version of a response from the second entity to the first entity indicating compliance with the request to interact with the network resource subject to acceptance of the assurances, wherein the response further includes reference to the assurances and the one or more standards of acceptability; and receive, by the second entity, a second digitally signed version of the response from the first entity, wherein the second digitally signed version of the response indicates that the first entity has verified the response.

\* \* \* \* \*